(12) United States Patent
Nakao et al.

(10) Patent No.: US 9,094,171 B2
(45) Date of Patent: Jul. 28, 2015

(54) TERMINAL APPARATUS AND RESPONSE SIGNAL MAPPING METHOD

(71) Applicant: Panasonic Intellectual Property Corporation of America, Torrance, CA (US)

(72) Inventors: Seigo Nakao, Kanagawa (JP); Daichi Imamura, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/570,678

(22) Filed: Dec. 15, 2014

(65) Prior Publication Data

US 2015/0098454 A1    Apr. 9, 2015

Related U.S. Application Data

(63) Continuation of application No. 13/695,198, filed as application No. PCT/JP2011/002205 on Apr. 14, 2011, now Pat. No. 8,942,199.

(30) Foreign Application Priority Data

May 6, 2010    (JP) ................................. 2010-106461

(51) Int. Cl.
    *H04W 72/04*    (2009.01)
    *H04W 84/12*    (2009.01)
    *H04L 5/00*     (2006.01)
    *H04J 3/16*     (2006.01)

(52) U.S. Cl.
    CPC ................. *H04L 5/0055* (2013.01); *H04J 3/16* (2013.01)

(58) Field of Classification Search
    CPC ..... H04W 72/04; H04W 80/04; H04B 7/2643
    USPC .......................... 370/235, 236, 329, 337, 347
    See application file for complete search history.

(56) References Cited

U.S. PATENT DOCUMENTS

2009/0274109 A1*  11/2009  Zhang et al. .................. 370/329
2010/0046460 A1    2/2010  Kwak et al.
(Continued)

OTHER PUBLICATIONS

3GPP TS 36.211 V8.7.0, "Physical Channels and Modulation (Release 8)," May 2009.
3GPP TS 36.212 V8.7.0, "Multiplexing and channel coding (Release 8)," May 2009.

(Continued)

*Primary Examiner* — Andrew Lee
(74) *Attorney, Agent, or Firm* — Pearne & Gordon LLP

(57) ABSTRACT

This invention relates to a terminal apparatus that can possibly reduce situations in which upstream channel data are punctured by a plurality of response signals. When having received at least one piece of downstream allocation control information corresponding to a second downstream unit band, which is other than a first downstream unit band, of a plurality of unit bands, a control unit (208) maps a plurality of response signals, which are corresponding to the respective ones of the plurality of downstream unit bands established, to a first resource corresponding to the plurality of downstream unit bands established. When having received only the downstream allocation control information corresponding to the first downstream unit band of the plurality of unit bands established, the control unit (208) maps the response signal, which is corresponding to the first downstream unit band, to a second resource corresponding to the first downstream unit band.

7 Claims, 9 Drawing Sheets

(56) References Cited

U.S. PATENT DOCUMENTS

| | | | |
|---|---|---|---|
| 2010/0189054 A1* | 7/2010 | Youn et al. | 370/329 |
| 2010/0317301 A1 | 12/2010 | Wang et al. | |
| 2011/0286414 A1* | 11/2011 | Qu et al. | 370/329 |
| 2011/0288062 A1* | 11/2011 | Sheardown et al. | 514/180 |
| 2012/0008585 A1* | 1/2012 | Kwon et al. | 370/329 |
| 2012/0147832 A1* | 6/2012 | Kim et al. | 370/329 |
| 2012/0195292 A1* | 8/2012 | Ko et al. | 370/336 |
| 2012/0269159 A1 | 10/2012 | Inoue et al. | |
| 2013/0100918 A1 | 4/2013 | Hong | |
| 2013/0148617 A1* | 6/2013 | Park et al. | 370/329 |
| 2013/0155898 A1* | 6/2013 | Yin et al. | 370/254 |
| 2013/0188587 A1 | 7/2013 | Kwak et al. | |
| 2013/0188589 A1 | 7/2013 | Nakashima et al. | |
| 2013/0279486 A1 | 10/2013 | Kato et al. | |
| 2013/0301503 A1* | 11/2013 | Park | 370/311 |
| 2013/0322358 A1* | 12/2013 | He et al. | 370/329 |
| 2014/0003398 A1 | 1/2014 | Kawamura et al. | |
| 2014/0092786 A1 | 4/2014 | He et al. | |

OTHER PUBLICATIONS

3GPP TS 36.213 V8.7.0, "Physical layer procedures (Release 8)," May 2009.

Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, Apr. 2009.

Ericsson, ST-Ericsson, PUCCH design for carrier aggregation, 3GPP TSG RAN WG1 Meeting #60bis, R1-101730, 3GPP, Apr. 16, 2010, p. 1-4.

Panasonic, UL ACK/NACK transmission on large payload size format, 3GPP TSG RAN WG1 Meeting #60bis, R1-102020, 3GPP, Apr. 16, 2010, p. 1-4.

International Search Report for PCT/JP2011/002205 dated Jul. 19, 2011.

3GPP TSG RAN WG1 Meeting #59bis "PUCCH resource allocation for carrier aggregation" Valencia, Spain, Jan. 18-22, 2010.

* cited by examiner

TERMINAL APPARATUS AND RESPONSE SIGNAL MAPPING METHOD

CROSS-REFERENCE TO RELATED APPLICATIONS

This application is a continuation of U.S. patent application Ser. No. 13/695,198 filed on Oct. 29, 2012 which is based on Japanese Patent Application No. 2010-106461 filed on May 6, 2010. The contents of these applications are herein incorporated by reference in their entirety.

TECHNICAL FIELD

The present invention relates to a terminal apparatus and a response signal mapping method.

BACKGROUND ART

3GPP LTE adopts OFDMA (Orthogonal Frequency Division Multiple Access) as a downlink communication scheme. In a radio communication system to which 3GPP LTE is applied, a base station apparatus (hereinafter, abbreviated as "base station") transmits a synchronization signal (i.e., Synchronization Channel: SCH) and broadcast signal (i.e., Broadcast Channel: BCH) using predetermined communication resources. A terminal apparatus (hereinafter abbreviated as "terminal") locates an SCH to secure synchronization with the base station first. After that, the terminal reads BCH information to acquire base station-specific parameters (e.g., frequency bandwidth) (see Non-Patent Literatures 1, 2, and 3).

Upon completion of the acquisition of the base station-specific parameters, the terminal sends a connection request to the base station to thereby establish communication with the base station. The base station transmits control information to the terminal with which communication has been established, via a PDCCH (Physical Downlink Control CHannel) as required.

The terminal then makes a "blind decision" on a plurality of control information portions included in the received PDCCH signal. That is, each of the control information portions includes a CRC (Cyclic Redundancy Check) portion and the base station masks this CRC portion with a terminal ID of the transmission target terminal. Therefore, the terminal cannot make a decision on whether the received control information portion is addressed to the terminal or not until the terminal demasks the CRC portion of the received control information portion with the terminal ID of the terminal. In the blind decision, if the demasking result shows that the CRC operation is OK, the control information portion is judged as being addressed to the terminal apparatus.

Furthermore, in 3GPP LTE, ARQ (Automatic Repeat Request) is applied to downlink data from the base station to the terminal. That is, the terminal feeds back a response signal indicative of an error detection result of the downlink data to the base station. The terminal performs a CRC on the downlink data and feeds back ACK (Acknowledgment) when CRC=OK (no error) or NACK (Negative Acknowledgment) when CRC=NO (error) to the base station as a response signal. Here, BPSK (Binary Phase Shift Keying) is used to modulate the response signal (that is, ACK/NACK signal). Furthermore, an uplink control channel such as PUCCH (Physical Uplink Control Channel) is used to feed back the response signal. When the received response signal indicates NACK, the base station transmits retransmission data to the terminal.

Here, the control information transmitted from the base station (that is, downlink allocation control information) contains resource allocation information including resource information or the like allocated to the terminal by the base station. The above-described PDCCH is used to transmit the control information. The PDCCH is formed of one or a plurality of L1/L2 CCHs (L1/L2 Control Channels). Each L1/L2 CCH is formed of one or a plurality of CCEs (Control Channel Elements). That is, the CCE is a base unit when control information is mapped to the PDCCH. Furthermore, when one L1/L2 CCH is formed of a plurality of CCEs, the plurality of CCEs having serial identification numbers (indices) are assigned to the L1/L2 CCH. The base station allocates the L1/L2 CCH to a resource allocation target terminal according to the number of CCEs necessary to notify the resource allocation target terminal of control information. The base station then transmits control information mapped to physical resources corresponding to CCEs of the L1/L2 CCH.

CCEs are associated with component resources of the PUCCH in a one-to-one correspondence. Therefore, the terminal that has received the L1/L2 CCH can implicitly identify the component resources of the PUCCH corresponding to the CCEs constituting the L1/L2 CCH and transmits a response signal to the base station using the identified resources. However, when the L1/L2 CCH occupies a plurality of consecutive CCEs, the terminal transmits a response signal to the base station using one of the plurality of PUCCH component resources corresponding to the plurality of CCEs (e.g., PUCCH component resource corresponding to a CCE having the smallest index). Downlink communication resources are thereby used efficiently.

A plurality of response signals and reference signals transmitted from a plurality of terminals are spread on a time axis (time domain) using a ZAC (Zero Auto-correlation) sequence (may also be called "base sequence") having a Zero Auto-correlation characteristic and Walsh code sequence or DFT (Discrete Fourier Transform) sequence as shown in FIG. 1, and code-multiplexed within a PUCCH (however, a ZAC sequence having a sequence length of 12 itself may also be called "reference sequence").

In FIG. 1, ($W_0$, $W_1$, $W_2$, $W_3$) represents a Walsh sequence (Walsh code sequence) having a sequence length of 4 and ($F_0$, $F_1$, $F_2$) represents a DFT sequence having a sequence length of 3. As shown in FIG. 1, in the terminal, an ACK or NACK response signal is primary-spread within 1 SC-FDMA symbol on the frequency axis using a ZAC sequence (having a sequence length of 12) first. Next, the primary-spread response signals are associated with $W_0$ to $W_3$ respectively and subjected to IFFT (Inverse Fast Fourier Transform). Furthermore, in the terminal, a ZAC sequence having a sequence length of 12 and serving as a reference signal is associated with $F_0$ to $F_2$ and subjected to IFFT. Thus, the response signal spread using the ZAC sequence having a sequence length of 12 on the frequency axis (Frequency domain) and the reference signal are converted to a ZAC sequence having a sequence length of 12 on the time axis through IFFT. This is equivalent to a primary-spread response signal and the reference signal after IFFT further being secondary-spread using a Walsh sequence (sequence length of 4) and a DFT sequence (sequence length of 3).

Response signals from different terminals are spread using ZAC sequences corresponding to different amounts of cyclic shift (cyclic shift indices) or orthogonal code sequences corresponding to different sequence numbers (orthogonal cover indices: OC indices). An orthogonal code sequence is a combination of a Walsh sequence and a DFT sequence. Furthermore, the orthogonal code sequence may also be referred to as "block-wise spreading code sequence." Therefore, the base station can demultiplex a plurality of code-multiplexed response signals, using conventional despreading and correlation processing (see Non-Patent Literature 4).

However, since each terminal makes a blind decision on downlink allocation control information addressed to the terminal apparatus in each subframe (transmission unit time), reception of downlink allocation control information is not always successful on the terminal side. When the terminal fails to receive downlink allocation control information addressed to the terminal in a certain downlink component carrier, the terminal cannot even know whether or not downlink data addressed to the terminal exists in the downlink component carrier. Therefore, when the terminal fails to receive downlink allocation control information in a certain downlink component carrier, the terminal does not generate any response signal for downlink data in the downlink component carrier either. This erroneous case is defined as DTX (Discontinuous transmission of ACK/NACK signals) of response signals in the sense that the terminal does not transmit any response signal. For simplicity in the following description, a situation where the terminal receives no downlink allocation control information in a certain downlink component carrier is simply represented as "DTX."

In a 3GPP LTE system (hereinafter, may also be referred to as "LTE system"), the base station allocates resources to uplink data and downlink data independently of each other. For this reason, in the LTE system, there may be a situation where in an uplink, the terminal (that is, a terminal supporting the LTE system (hereinafter referred to as "LTE terminal")) needs to transmit a response signal for downlink data, and uplink data simultaneously. In this situation, the response signal and uplink data from the terminal are transmitted using time multiplexing (Time Division Multiplexing: TDM). Thus, single carrier properties of a transmission waveform of the terminal are maintained by simultaneously transmitting the response signal and uplink data using TDM.

Furthermore, as shown in FIG. 2, in time multiplexing (TDM), a response signal ("A/N") transmitted from the terminal is transmitted to the base station by occupying some of resources allocated for uplink data (i.e., PUSCH (Physical Uplink Shared CHannel) resources) (i.e., some SC-FDMA symbols adjacent to an SC-FDMA symbol to which a reference signal (RS) is mapped. "Subcarriers" on the vertical axis in the figure may also be called "virtual subcarriers" or "time contiguous signals," however. Thus, "temporally contiguous signals" which are collectively received in a DFT (Discrete Fourier Transform) circuit in an SC-FDMA transmitter are represented as "subcarriers" for convenience. That is, in PUSCH resources, arbitrary data of uplink data is punctured by a response signal. For this reason, arbitrary bits of coded uplink data are punctured, so that the quality of the uplink data (e.g., coding gain) is degraded significantly. For that reason, the base station instructs the terminal on quite a low coding rate or quite large transmission power to thereby compensate for quality degradation of the uplink data caused by puncturing.

Furthermore, standardization of 3GPP LTE-advanced for realizing faster communication than 3GPP LTE has started. 3GPP LTE-advanced systems (hereinafter, may also be referred to as "LTE-A systems") follow LTE systems. 3GPP LTE-advanced is expected to introduce base stations and terminals communicable at a wideband frequency of 40 MHz or more to realize a downlink transmission rate of a maximum of 1 Gbps or above.

To simultaneously realize an ultra-high-speed communication several times faster than transmission rates in LTE systems and backward compatibility with LTE systems, in LTE-A systems, LTE-A system bands are divided into "component carriers" of 20 MHz or below which is the bandwidth supported by LTE systems. That is, the "component carrier" is a band having a maximum width of 20 MH and is defined as a base unit of communication band. Furthermore, a "component carrier" in a downlink (hereinafter referred to as "downlink component carrier") may be defined as a band obtained by dividing a band according to downlink frequency band information in a BCH broadcasted from the base station or a band defined by a distribution width in the case where a downlink control channel (PDCCH) is distributed in a frequency domain. Furthermore, a "component carrier" in an uplink (hereinafter referred to as "uplink component carrier") may be defined as a band obtained by dividing a band according to uplink frequency band information in a BCH broadcasted from the base station or a base unit for a communication band of 20 MHz or below including a PUSCH region near its center and PUCCHs for LTE at both ends. Furthermore, the term "component carrier" is often used in English, or may also be defined by a physical cell number and carrier frequency number, or may be called "cell."

The LTE-A system supports communication using a band that bundles several component carriers, so-called "carrier aggregation." Throughput requirements for an uplink are generally different from throughput requirements for a downlink. In the LTE-A system, carrier aggregation in which the number of component carriers set for any terminal supporting an LTE-A system (hereinafter referred to as "LTE-A terminal") is different between the uplink and the downlink, so-called "asymmetric carrier aggregation" is also being discussed. Furthermore, the LTE-A system also supports configurations where the numbers of component carriers are asymmetric between the uplink and downlink and the component carriers have different frequency bandwidths.

FIGS. 3A & 3B are diagrams illustrating asymmetric carrier aggregation and a control sequence applied to individual terminals. FIGS. 3A & 3B show examples where bandwidths and the numbers of component carriers are symmetric between an uplink and a downlink of a base station.

In FIG. 3B, a setting (hereinafter, referred to as "configuration") is made for terminal 1 such that carrier aggregation is performed using two downlink component carriers and one uplink component carrier on the left side, whereas a configuration is made for terminal 2 such that although the two same downlink component carriers as those in terminal 1 are used, one uplink component carrier on the right side is used for uplink communication.

Referring to terminal 1, an LTE-A base station and an LTE-A terminal included in an LTE-A system transmit and receive signals to and from each other according to a sequence diagram illustrated in FIG. 3A. As illustrated in FIG. 3A, (1) terminal 1 is synchronized with the downlink component carrier on the left side when starting communication with the base station, and reads information on the uplink component carrier from a broadcast signal called "SIB2 (system information block type 2)," the uplink component carrier forming a pair with the downlink component carrier on the left side. (2) Using this uplink component carrier, terminal 1 starts communication with the base station by transmitting, for example, a connection request to the base station.

(3) Upon determining that a plurality of downlink component carriers need to be assigned to the terminal, the base station instructs the terminal to add the downlink component carriers. However, FIGS. 3A & 3B illustrates the case where the number of uplink component carriers does not increase, and terminal 1, which is an individual terminal, starts asymmetric carrier aggregation.

As shown above, when performing communication with a terminal using the aforementioned carrier aggregation, the base station first configures a plurality of downlink component carriers for the terminal. The configuration of these downlink component carriers is reported from the base station to the terminal using higher layer signaling such as RRC signaling. However, the base station does not always transmit downlink data using all downlink component carriers configured in the terminal but assigns downlink data to each of the plurality of downlink component carriers only when necessary (only for some subframes) and transmits signals. How the downlink data is allocated herein is reported to the terminal with the aforementioned downlink allocation control information.

CITATION LIST

Non-Patent Literatures

NPL 1
3GPP TS 36.211 V8.7.0, "Physical Channels and Modulation (Release 8)," May 2009
NPL 2
3GPP TS 36.212 V8.7.0, "Multiplexing and channel coding (Release 8)," May 2009
NPL 3
3GPP TS 36.213 V8.7.0, "Physical layer procedures (Release 8)," May 2009
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009

SUMMARY OF INVENTION

Technical Problem

In an LTE-A system to which the aforementioned carrier aggregation is applied, a terminal may receive downlink data in a plurality of downlink component carriers at a time. That is, the terminal may have to simultaneously transmit a plurality of response signals corresponding to a plurality of downlink data portions, respectively.

Furthermore, in an LTE-A system, a base station allocates resources to uplink data and downlink data independently of each other as in an LTE system. For this reason, in the LTE-A system, there may be a situation where, in an uplink, an LTE-A terminal has to transmit a plurality of response signals for a plurality of downlink data portions simultaneously with uplink data.

In this situation, to maintain power efficiency of the terminal, it is necessary to maintain single carrier characteristics of a transmission waveform of the terminal. That is, in this situation, to maintain power efficiency of the terminal, it is necessary to apply "time multiplexing (TDM) of a plurality of response signals and uplink data" as in the case of the LTE system.

As described above, however, when "time multiplexing (TDM) of a plurality of response signals and uplink data" is applied, the quality of the uplink data (e.g., coding gain) degrades significantly because arbitrary data of the uplink data is punctured by the response signals in a PUSCH resource. Especially, since the number of bits of a response signal increases when carrier aggregation is applied, the quality degradation of the uplink data becomes more serious. That is, it is important for the LTE-A system to avoid a situation where uplink data is punctured by a plurality of response signals wherever possible.

However, for an LTE-A system to which carrier aggregation using a plurality of downlink component carriers is applied, sufficient studies have not been carried out so far regarding methods of avoiding, wherever possible, situations where uplink data may be punctured by a plurality of response signals.

It is an object of the present invention to provide a terminal apparatus and a response signal mapping method capable of minimizing situations where uplink data is punctured by a plurality of response signals in a communication system to which carrier aggregation using a plurality of downlink component carriers is applied.

Solution to Problem

A terminal apparatus according to a first aspect of the present invention communicates with a base station, using some or all of a plurality of configured downlink component carriers, the apparatus including: a receiving section that receives downlink allocation control information portions transmitted through downlink control channels of the plurality of downlink component carriers and downlink data transmitted through a downlink data channel indicated by the downlink allocation control information portions; a generating section that generates a response signal based on success or failure in receiving the downlink data; and a mapping section that maps the response signal to an uplink resource, in which, upon receipt of at least one of the downlink allocation control information portions that corresponds to a second downlink component carrier other than a first downlink component carrier among the plurality of component carriers, the mapping section maps the plurality of response signals respectively corresponding to the plurality of downlink component carriers to first resources corresponding to the plurality of configured downlink component carriers, and upon receipt of only the downlink allocation control information portion that corresponds to the first downlink component carrier among the plurality of component carriers, the mapping section maps the response signal corresponding to the first downlink component carrier to second resources corresponding to the first downlink component carrier.

A response signal mapping method according to a second aspect of the present invention is a method in a terminal apparatus that communicates with a base station, using some or all of a plurality of configured downlink component carriers, the method including: receiving downlink allocation control information portions transmitted through downlink control channels of the plurality of downlink component carriers; receiving downlink data transmitted through a downlink data channel indicated by the downlink allocation control information portions; generating a response signal based on success or failure in receiving the downlink data; mapping the plurality of response signals respectively corresponding to the plurality of downlink component carriers to first resources corresponding to the plurality of configured downlink component carriers, upon receipt of at least one of the downlink allocation control information portions that corresponds to a second downlink component carrier other than a first downlink component carrier among the plurality of component carriers; and mapping the response signal corresponding to the first downlink component carrier to second resources corresponding to the first downlink component carrier, upon receipt of only the downlink allocation control information portion corresponding to the first downlink component carrier among the plurality of component carriers.

Advantageous Effects of Invention

According to the present invention, in a communication system to which carrier aggregation using a plurality of downlink component carriers is applied, it is possible to minimize situations where uplink data is punctured by a plurality of response signals.

DESCRIPTION OF EMBODIMENTS

Hereinafter, embodiments of the present invention will be described in detail with reference to the accompanying drawings.

First, before describing a specific configuration and operation of an embodiment, a description is given of a method on which the present inventor et al. focuses attention as a method of transmitting a plurality of response signals for a plurality of downlink data portions transmitted in a plurality of downlink component carriers, respectively, and uplink data using TDM in an LTE-A system to which carrier aggregation using a plurality of downlink carrier components is applied.

Figure 4:
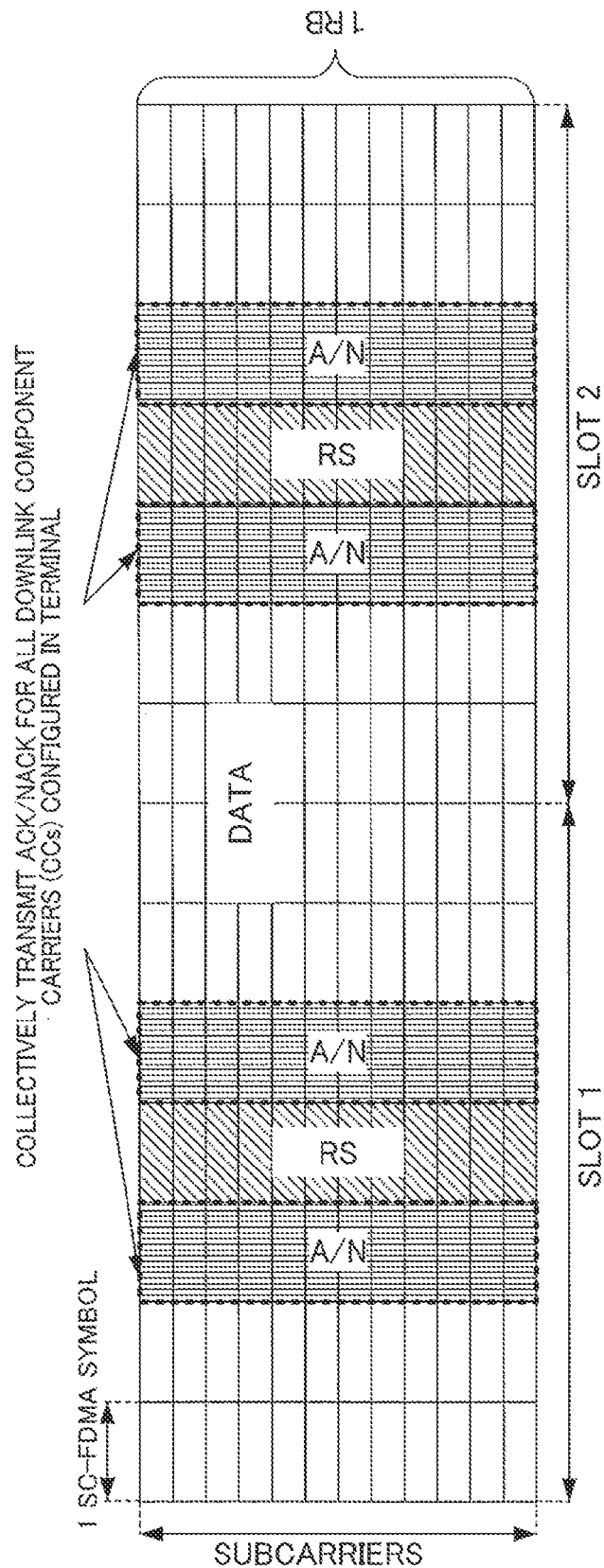
FIG. 4 is a diagram illustrating simultaneous transmission processing on response signals and uplink data according to an embodiment of the present invention.

As a first method of simultaneously transmitting a plurality of response signals and uplink data within the same subframe using TDM, there can be a method as shown in FIG. 4, whereby a terminal transmits, together with the uplink data, response signals corresponding to all downlink component carriers configured in the terminal (each of the response signals being ACK, NACK or DTX (that is, a case where no downlink allocation control information is received in the downlink component carriers)) by mapping the response signals to a "region determined in accordance with the number of downlink component carriers configured in the terminal" in a PUSCH.

A description will be given of a case where five downlink component carriers are configured in the terminal and the terminal receives downlink allocation control information only in one of the downlink component carriers in the first method, for example. In this case, the terminal configures ACK or NACK for a response signal component corresponding to one downlink component carrier for which downlink allocation control information has been received, in accordance with success/failure in receiving downlink data. On the other hand, the terminal configures DTX for response signal components corresponding to the four downlink component carriers other than the downlink component carrier for which the downlink allocation control information has been received. The terminal then transmits a response signal formed of response signal components corresponding to five downlink component carriers.

However, as described above, the configurations of downlink component carriers for the terminal are set using higher layer signaling. Since the higher layer signaling is protected by the application of ARQ, the signaling has high reliability, but it takes more time until the signaling arrives at the terminal from the base station. That is, the higher layer signaling cannot be controlled fast. Furthermore, since overhead per message in the higher layer signaling is large, the configurations of downlink component carriers for the terminal cannot be frequently changed.

Therefore, once the base station configures a plurality of downlink component carriers for the terminal, the base station transmits downlink data using some or all of the downlink component carriers set in the terminal as required, without frequently changing the number of downlink component carriers set in the terminal. That is, even when the base station configures a plurality of downlink component carriers in the terminal, the base station assigns a plurality of downlink data portions to the plurality of downlink component carriers configured in the terminal only when a large number of downlink data portions need to be instantaneously transmitted to the terminal.

For this reason, in the first method, in most subframes (i.e., during a time when it is not necessary to transmit a large number of downlink data portions instantaneously), there can be a situation where only one response signal required by the base station (that is, one response signal generated when downlink allocation control information is received in only one downlink component carrier, which may also called "response signal during non-carrier aggregation assignment") is transmitted using the aforementioned "region determined in accordance with the number of downlink component carriers configured in the terminal." That is, although the base station requires only one response signal, uplink data is punctured and a plurality of response signals are mapped in accordance with the size of the "region determined in accordance with the number of downlink component carriers configured in the terminal" and the transmission quality of the uplink data is degraded significantly.

Figure 5A:
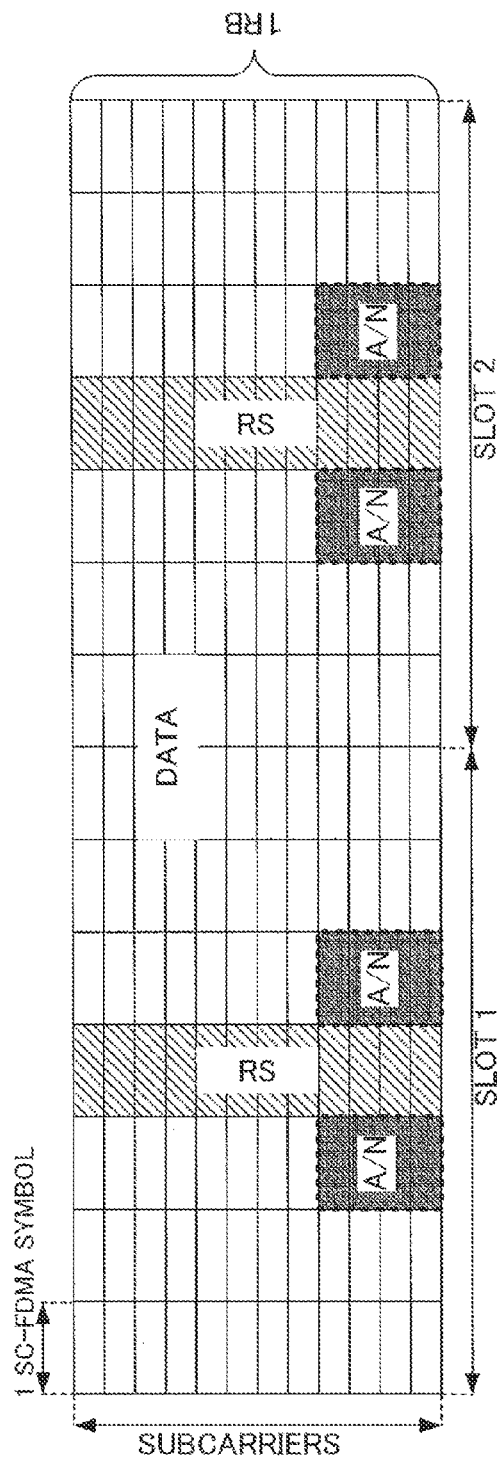
FIGS. 5A & 5B are diagrams illustrating simultaneous transmission processing on response signals and uplink data according to an embodiment of the present invention.
Figure 5B:
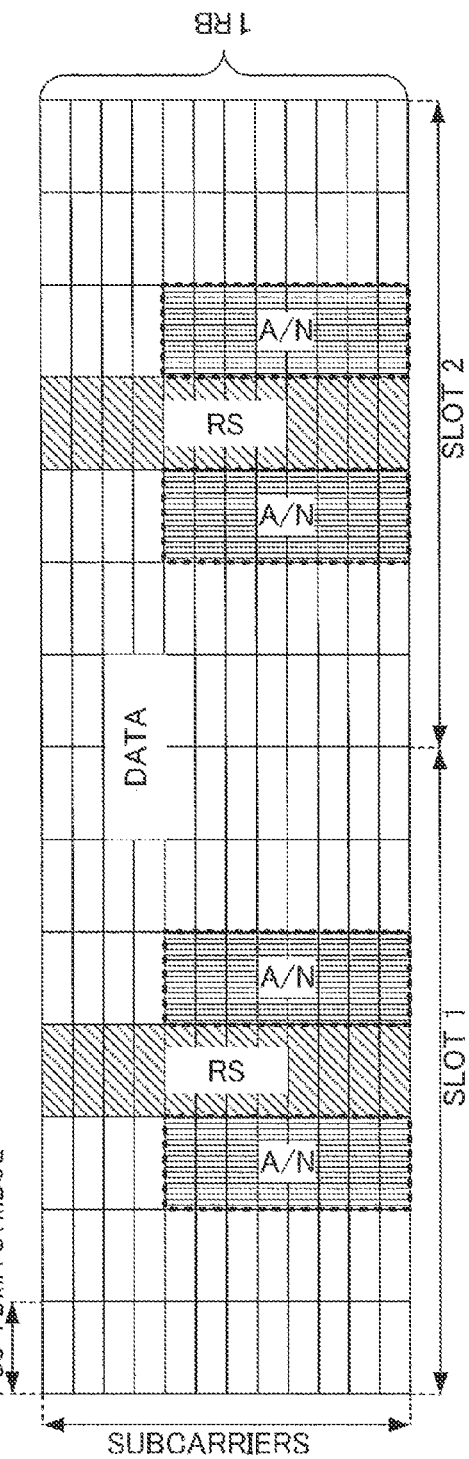

As a method for solving problems in the first method, a second method described below is a conceivable option. The second method determines a region in which response signals (uplink response signals) are mapped within a PUSCH allocated for uplink data in accordance with the number of downlink allocation control information portions received by the terminal. FIGS. 5A & 5B illustrates a conceptual diagram of the second method.

For example, FIG. 5A shows a mapping example of response signals when the terminal receives one downlink allocation control information portion and FIG. 5B shows a mapping example of response signals when the terminal receives two downlink allocation control information portions. That is, in the second method, as shown in FIG. 5A and FIG. 5B, the terminal maps response signals for downlink component carriers for which downlink allocation control information portions have been received to a "region determined in accordance with the number of downlink allocation control information portions received by the terminal" in a PUSCH and transmits the response signals together with uplink data. Thus, regarding PUSCH resources, the region to which response signals are mapped (region in which uplink data is punctured) changes depending on the number of downlink allocation control information portions received by the terminal as shown in FIG. 5A (the number of downlink allocation control information portions: 1) and FIG. 5B (the number of downlink allocation control information portions: 2) (that is, the number of downlink data portions allocated to the terminal). Thus, the second method changes the portion in which uplink data is punctured by response signals in accordance with the number of the downlink allocation control information portions received by the terminal, and can thereby minimize the degradation of transmission quality of the uplink data caused by response signals puncturing the uplink data.

However, when the second method is applied, if the terminal fails to receive downlink allocation control information, a difference may occur in recognition regarding mapping positions of response signals (response signal region) between the base station and the terminal, preventing the base station from correctly receiving response signals.

For example, a case will be described where the base station transmits two downlink data portions and two downlink allocation control information portions on the two downlink data portions, but the terminal fails to receive one of the downlink allocation control information portions. In this case, since the terminal receives only one downlink allocation control information portion, the terminal punctures uplink data (Data) by one response signal (A/N) based on the mapping shown in FIG. 5A and transmits the punctured signal. On the other hand, since the base station has transmitted two downlink allocation control information portions, the base station assumes that two response signals (A/N) would be transmitted from the terminal according to the mapping shown in FIG. 5B. Therefore, although only one response signal has actually been transmitted as shown in FIG. 5A, the base station performs reception processing on response signals according to the mapping shown in FIG. 5B. Thus, the base station receives part of the uplink data (Data) shown in FIG. 5A (that is, uplink data mapped to the region in FIG. 5A, where the response signals are mapped in FIG. 5B) as part of response signals. This causes a significant deterioration in the reception characteristics of response signals at the base station.

Furthermore, in this case, there is also a problem that the base station cannot determine which downlink component carrier is used to transmit the response signal transmitted from the terminal as the response signal corresponding to the downlink data transmitted. This phenomenon occurs when the terminal fails to receive one of the two downlink allocation control information portions. Accordingly, if a BLER (block error rate) of the downlink allocation control information is assumed to be 1%, the aforementioned "difference in recognition of the response signal region between the base station and the terminal" can be said to occur with a probability of approximately 2%. Furthermore, the rate of occurrence of a "difference in recognition of the response signal region between the base station and the terminal" linearly increases as the number of downlink component carriers in which downlink allocation control information is transmitted increases.

Thus, a description will be given of a terminal and a signal transmission control method in an LTE-A system to which carrier aggregation using a plurality of downlink component carriers is applied. The terminal and signal transmission control method can reduce, when the terminal transmits a plurality of response signals and uplink data simultaneously, the possibility that the uplink data may be punctured by the response signals and also reduce the occurrence of difference in recognition between the base station and the terminal, regarding a response signal region within a PUSCH assigned to the uplink data 1.

[Overview of Communication System]

A communication system including base station 100 and terminal 200, which will be described later, performs communication using one uplink component carrier and N (N is a natural number equal to or above 2) downlink component carriers associated with the uplink component carrier, that is, communication using asymmetric carrier aggregation specific to terminal 200. The uplink component carrier and N downlink component carriers configured for terminal 200 are a "component carrier group." Furthermore, this communication system also includes terminals that do not have capability of performing communication using carrier aggregation, unlike terminal 200, and perform communication using one downlink component carrier and one uplink component carrier associated therewith (that is, communication without carrier aggregation).

Therefore, base station 100 is configured to support both communication using carrier aggregation and communication without carrier aggregation.

Furthermore, communication without carrier aggregation may also be performed between base station 100 and terminal 200, depending on resource allocation to terminal 200 by base station 100.

For communication without carrier aggregation, this communication system performs conventional ARQ based on one response signal corresponding to one downlink data.

On the other hand, For communication using carrier aggregation, the communication system performs ARQ based on a plurality of response signals corresponding to a plurality of downlink data portions. That is, this communication system is an LTE-A system, while base station 100 is an LTE-A base station and terminal 200 is an LTE-A terminal, for example. Furthermore, a terminal not capable of performing communication using carrier aggregation is, for example, an LTE terminal.

A description will be given based on the following assumption. That is, between base station 100 and terminal 200, asymmetric carrier aggregation specific to terminal 200 is configured beforehand and information on downlink component carriers and uplink component carriers used in terminal 200 is shared between base station 100 and terminal 200. Furthermore, base station 100 determines one of the plurality of downlink component carriers configured in terminal 200 as a basic component carrier (PCC: Primary Component Carrier) and information on this primary component carrier is also shared between base station 100 and terminal 200.

However, base station 100 does not always transmit signals to terminal 200 using all of the plurality of downlink component carriers configured in terminal 200. When transmitting signals to the terminal using only one downlink component carrier, base station 100 uses the aforementioned primary component carrier (PCC) in priority to the others.

[Configuration of Base Station]

Figure 6:
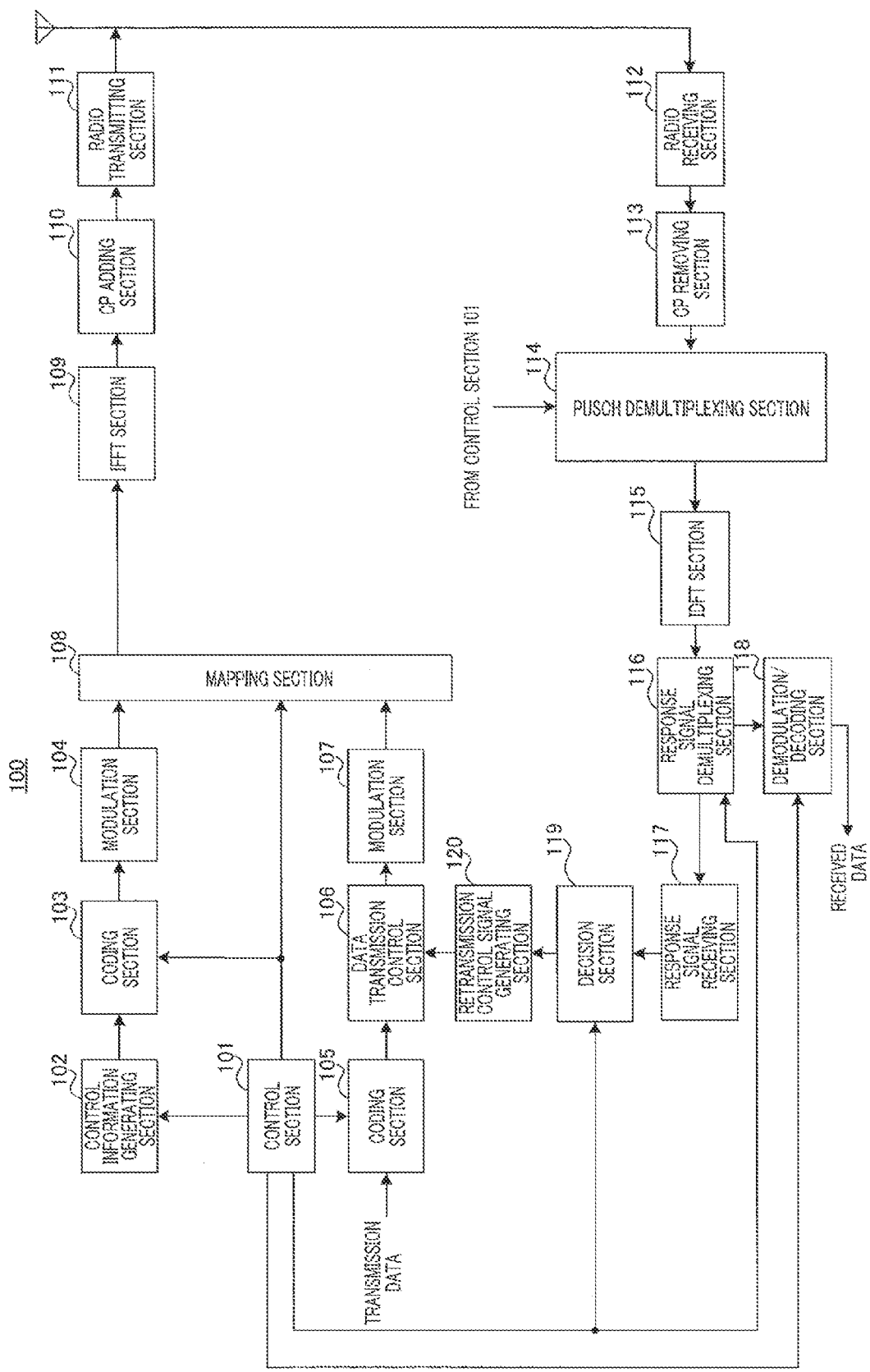
FIG. 6 is a block diagram illustrating a configuration of a base station according to the embodiment of the present invention.

FIG. 6 is a block diagram illustrating a configuration of base station 100 according to the present embodiment. Base station 100 communicates with the terminal using a component carrier group formed of N downlink component carriers and an uplink component carrier.

In base station 100 shown in FIG. 6, control section 101 assigns, to resource allocation target terminal 200, downlink resources to transmit control information (that is, downlink control information allocation resources and uplink control information allocation resources) and downlink resources to transmit downlink data contained in the control information (that is, downlink data allocation resources) and uplink resources to transmit uplink data (that is, uplink data allocation resources). Such resource allocation is performed in downlink component carriers and uplink component carriers included in a component carrier group configured in resource allocation target terminal 200. Furthermore, downlink control information allocation resources and uplink control information allocation resources are selected from among resources corresponding to a downlink control channel (PDCCH) in each downlink component carrier. Furthermore, downlink data allocation resources are selected from among resources corresponding to a downlink data channel (PDSCH) in each downlink component carrier and uplink data allocation resources are selected from among resources corresponding to an uplink data channel (PUSCH) in each uplink component carrier. Furthermore, when there are a plurality of resource allocation target terminals 200, control section 101 assigns different resources to each of those resource allocation target terminals 200.

Downlink control information allocation resources and uplink control information allocation resources are equivalent to the above L1/L2 CCH. That is, a downlink control information allocation resource or an uplink control information allocation resource is formed of one or a plurality of CCEs. Furthermore, CCEs contained in downlink control information allocation resources are associated with component resources of an uplink control channel (PUCCH) in a one-to-one correspondence.

Furthermore, control section 101 determines a coding rate used to transmit control information to resource allocation target terminal 200. Since the amount of data of control information differs depending on this coding rate, control section 101 assigns downlink control information allocation resources and uplink control information allocation resources having the number of CCEs to which control information of the amount of data can be mapped.

Control section 101 then outputs information on downlink data allocation resources and uplink data allocation resources to control information generating section 102. Furthermore, control section 101 outputs information on a coding rate used to transmit control information to coding section 103.

Furthermore, control section 101 determines a coding rate of transmission data (that is, downlink data), outputs the coding rate to coding section 105, determines a coding rate of received data (that is, uplink data) and outputs the coding rate to demodulation/decoding section 118. Furthermore, control section 101 outputs information on downlink data allocation resources, downlink control information allocation resources and uplink control information allocation resources to mapping section 108. Furthermore, control section 101 outputs information on a physical channel whereby the terminal should transmit a response signal to response signal demultiplexing section 116 and decision section 119. However, control section 101 performs control such that downlink data and downlink allocation control information for reporting downlink data allocation resources to be used for the downlink data are mapped to the same downlink component carrier.

Control information generating section 102 generates control information for reporting downlink data allocation resources and control information for reporting uplink data allocation resources and outputs the control information to coding section 103. The control information is generated for each downlink component carrier and for each uplink component carrier. Furthermore, when there are a plurality of resource allocation target terminals 200, the control information includes terminal IDs of the destination terminals to distinguish between resource allocation target terminals 200. For example, the control information includes a CRC bit masked with a terminal ID of a destination terminal. The control information may be called "downlink allocation control information" and "uplink allocation control information."

Coding section 103 encodes the control information received from control information generating section 102 according to the coding rate received from control section 101 and outputs the encoded control information to modulation section 104.

Modulation section 104 modulates the encoded control information and outputs the modulated signal thus obtained to mapping section 108.

Coding section 105 receives transmission data of each transmission destination terminal 200 (that is, downlink data) and coding rate information from control section 101 as input, encodes the transmission data at a coding rate indicated by the coding rate information and outputs the encoded transmission data to data transmission control section 106. However, when a plurality of downlink component carriers are assigned to transmission destination terminal 200, coding section 105 encodes transmission data transmitted in each downlink component carrier and outputs the encoded transmission data to data transmission control section 106.

Data transmission control section 106 retains the encoded transmission data at initial transmission and outputs the encoded transmission data to modulation section 107. The encoded transmission data is retained for each transmission destination terminal 200. Furthermore, transmission data to one transmission destination terminal 200 is retained for each downlink component carrier in which the transmission data is transmitted. This enables not only retransmission control of whole data transmitted to transmission destination terminal 200 but also retransmission control of each downlink component carrier.

Furthermore, when a retransmission control signal received from retransmission control signal generating section 120 indicates a retransmission instruction, data transmission control section 106 outputs the retained data corresponding to the retransmission control signal to modulation section 107. Furthermore, when the retransmission control signal received from retransmission control signal generating section 120 indicates no retransmission, data transmission control section 106 deletes the retained data corresponding to the retransmission control signal. In this case, data transmission control section 106 outputs the next initial transmission data to modulation section 107.

Modulation section 107 modulates the encoded transmission data received from data transmission control section 106 and outputs the modulated signal to mapping section 108.

Mapping section 108 maps the modulated signal of the control information received from modulation section 104

(downlink allocation control information or uplink allocation control information) to resources indicated by downlink control information allocation resources and uplink control information allocation resources (resources in PDCCH) received from control section 101 and outputs the resulting signal to IFFT section 109.

Furthermore, mapping section 108 maps the modulated signal of the transmission data received from modulation section 107 (i.e., downlink data) to resources indicated by the downlink data allocation resources received from control section 101 (resources in PDSCH) and outputs the resulting signal to IFFT section 109.

The control information and transmission data (i.e., downlink data) mapped to a plurality of subcarriers in a plurality of downlink component carriers in mapping section 108 are transformed from frequency-domain signal into time-domain signal in IFFT section 109. Then, a CP is added the signal in CP adding section 110 to transform the signal into an OFDM signal, which is then subjected to transmission processing such as D/A conversion, amplification and up-conversion in radio transmitting section 111 and transmitted to terminal 200 via an antenna. Thus, uplink allocation control information and downlink allocation control information are transmitted through downlink control channels in N downlink component carriers and downlink data is transmitted through a downlink data channel indicated by the downlink allocation control information.

Radio receiving section 112 receives a signal including an uplink data channel signal (PUSCH signal) transmitted from terminal 200 via the antenna and performs reception processing such as down-conversion, A/D conversion on the received signal. The PUSCH signal includes uplink data. However, when response signals and uplink data are time-multiplexed (TDM) in terminal 200, the PUSCH signal contains both uplink data and response signals.

CP removing section 113 removes a CP added to the received signal after the reception processing.

PUSCH demultiplexing section 114 demultiplexes the PUSCH signal contained in the received signal through FFT (Fast Fourier Transform) processing on the frequency axis according to an instruction from control section 101. PUSCH demultiplexing section 114 then outputs frequency components of the extracted PUSCH signal (signal containing only uplink data or signal containing both uplink data and response signals) to IDFT (Inverse Discrete Fourier Transform) section 115.

IDFT section 115 applies IDFT processing to the frequency components of the PUSCH signal received from PUSCH demultiplexing section 114 and transforms the PUSCH signal into a signal on the time axis.

Response signal demultiplexing section 116 demultiplexes, on the time axis, the signal components that may contain response signals and signal components containing uplink data from the PUSCH signal on the time axis received from IDFT section 115 according to an instruction from control section 101. Response signal demultiplexing section 116 outputs the signal components containing response signals to response signal receiving section 117 and outputs the signal components containing the uplink data to demodulation/decoding section 118.

Response signal receiving section 117 demodulates/decodes a signal component corresponding to the response signal received from response signal demultiplexing section 116 and outputs the decoded signal and likelihood information to decision section 119.

Demodulation/decoding section 118 demodulates/decodes a signal component containing the uplink data received from response signal demultiplexing section 116 using a coding rate corresponding to the uplink data received from control section 101 and outputs the demodulated/decoded data as received data.

Decision section 119 decides whether or not the response signal based on the error detection result of downlink data is contained in an uplink data channel (i.e., PUSCH resource) indicated by uplink allocation control information according to an instruction from control section 101.

To be more specific, decision section 119 decides whether or not the response signal is transmitted using a PUSCH resource from terminal 200 based on the likelihood information received from response signal receiving section 117. That is, when the degree of likelihood indicated by the likelihood information received from response signal receiving section 117 is equal to or below a certain threshold, decision section 119 decides that terminal 200 has not transmitted any response signal using a PUSCH resource. In this case, decision section 119 outputs information indicating "DTX for all response signals" to retransmission control signal generating section 120. On the other hand, when the degree of likelihood indicated by the likelihood information received from response signal receiving section 117 is above the certain threshold, decision section 119 decides that terminal 200 has transmitted a response signal using a PUSCH resource. In this case, decision section 119 further detects, through coherent detection, for example, which of ACK, NACK or DTX the response signals corresponding to the respective downlink component carriers indicate. Decision section 119 then outputs the decision result (ACK, NACK or DTX) to retransmission control signal generating section 120.

Retransmission control signal generating section 120 decides whether or not to retransmit data (downlink data) transmitted in each downlink component carrier, based on the decision result (ACK, NACK or DTX) regarding the response signal received from decision section 119 and generates a retransmission control signal based on the decision result. To be more specific, when receiving a response signal indicating NACK or DTX regarding certain downlink data, retransmission control signal generating section 120 generates a retransmission control signal indicating a retransmission instruction of the downlink data and outputs the generated retransmission control signal to data transmission control section 106. Furthermore, when receiving a response signal indicating ACK regarding certain downlink data, retransmission control signal generating section 120 generates a retransmission control signal indicating that the downlink data is not retransmitted and outputs the generated retransmission control signal to data transmission control section 106.

[Configuration of Terminal]

Figure 7:
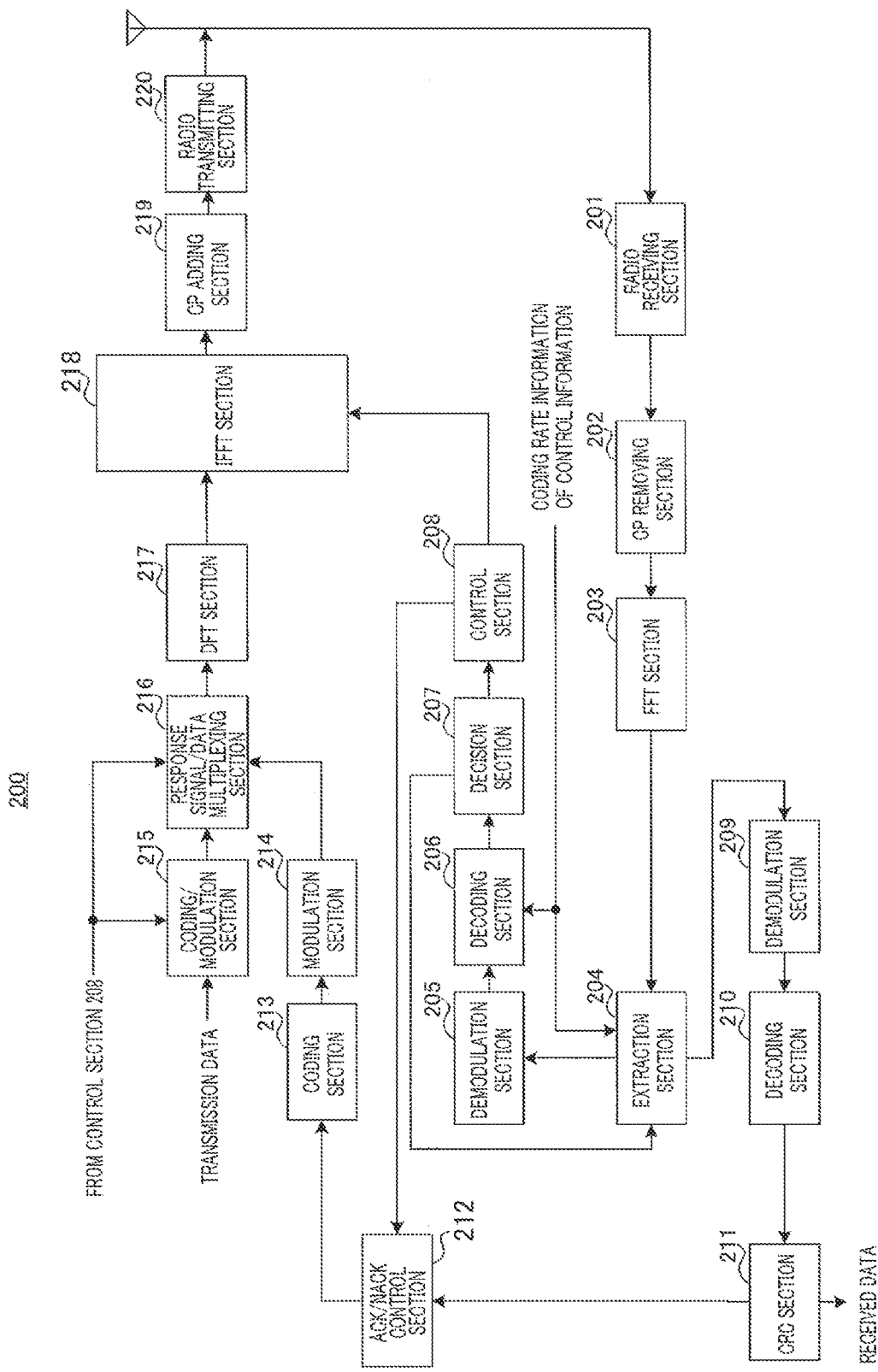
FIG. 7 is a block diagram illustrating a configuration of a terminal according to the embodiment of the present invention.

FIG. 7 is a block diagram illustrating a configuration of terminal 200 according to the present embodiment. Terminal 200 communicates with base station 100 using a component carrier group formed of N downlink component carriers and an uplink component carrier and transmits response signals through an uplink control channel of the uplink component carrier based on the error detection result of the downlink data arranged in the downlink component carrier.

In terminal 200 shown in FIG. 7, radio receiving section 201 receives an OFDM signal transmitted from base station 100 via an antenna and performs reception processing such as down-conversion and A/D conversion on the received OFDM signal. The received OFDM signal contains a PDSCH signal or PDCCH signal. That is, terminal 200 receives uplink allocation control information and downlink allocation control information transmitted through downlink control channels in N downlink component carriers and receives downlink data transmitted through a downlink data channel indicated by the downlink allocation control information.

CP removing section 202 removes a CP added to the OFDM signal after the reception processing.

FFT section 203 applies FFT to the received OFDM signal to transform the signal into a frequency-domain signal and outputs the received signal obtained to extraction section 204.

Extraction section 204 extracts a downlink control channel signal (PDCCH signal) from the received signal received from FFT section 203, according to coding rate information to be received. That is, since the number of CCEs constituting a downlink control information allocation resource varies depending on the coding rate, extraction section 204 extracts the downlink control channel signal using the number of CCEs corresponding to the coding rate as the extraction unit. Furthermore, the downlink control channel signal is extracted for each downlink component carrier. The extracted downlink control channel signal is outputted to demodulation section 205.

Furthermore, extraction section 204 extracts downlink data (i.e., downlink data channel signal (PDSCH signal)) from the received signal based on information on downlink data allocation resources addressed to the mobile station received from decision section 207 and outputs the extracted downlink data to demodulation section 209.

Demodulation section 205 demodulates the downlink control channel signal received from extraction section 204 and outputs the demodulation result obtained to decoding section 206.

Decoding section 206 decodes the demodulation result received from demodulation section 205, according to the received coding rate information and outputs the decoding result obtained to decision section 207.

Decision section 207 makes a blind decision on whether or not the control information contained in the decoding result received from decoding section 206 is control information addressed to the terminal. This decision is made based on the decoding result corresponding to the above extraction unit. For example, decision section 207 demasks a CRC bit with the terminal ID of the terminal and decides that control information resulting in CRC=OK (no error) is control information addressed to the terminal. Decision section 207 then outputs information on downlink data allocation resources corresponding to the terminal, contained in the downlink allocation control information addressed to the terminal to extraction section 204. Furthermore, decision section 207 outputs the uplink allocation control information addressed to the terminal to control section 208.

Control section 208 identifies a PUSCH resource (frequency position in an uplink component carrier) used for transmission of uplink data based on information on uplink data allocation resources corresponding to the terminal, contained in the uplink allocation control information received from decision section 207. Control section 208 then outputs the identified PUSCH resource to IFFT section 218. Furthermore, control section 208 identifies the coding rate and modulation scheme of the uplink data based on the uplink allocation control information and outputs the identified coding rate and modulation scheme to coding/modulation section 215.

Furthermore, when response signals for uplink data and downlink data are transmitted in the same subframe, control section 208 instructs response signal/data multiplexing section 216 and IFFT section 218 to multiplex (TDM) the uplink data and response signals in the time domain. At this time, control section 208 controls the region in a PUSCH for mapping response signals based on the reception situation of the downlink allocation control information.

Furthermore, control section 208 outputs identification information of the downlink component carrier to which control information addressed to the terminal is mapped to ACK/NACK control section 212.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 generates the downlink data decoded and received from decoding section 210, performs error detection on each downlink component carrier using a CRC and outputs ACK when CRC=OK (no error) and NACK when CRC=NO (error) to ACK/NACK control section 212. Furthermore, when CRC=OK (no error), CRC section 211 outputs the decoded downlink data as received data.

ACK/NACK control section 212 generates a response signal to be transmitted by the terminal to base station 100 based on the reception situation of downlink data transmitted in each downlink component carrier included in the component carrier group configured in the terminal.

To be more specific, ACK/NACK control section 212 generates a bundled ACK/NACK signal as a response signal based on identification information of the downlink component carrier received from control section 208 and success/failure in receiving downlink data. To be more specific, when terminal 200 receives downlink allocation control information using only a primary component carrier (PCC), ACK/NACK control section 212 generates only a response signal for the downlink data of the primary component carrier and outputs the generated response signal to coding section 213. Furthermore, when terminal 200 receives even one downlink allocation control information portion in a downlink component carrier other than the primary component carrier, ACK/NACK control section 212 generates response signals corresponding to all downlink component carriers configured for terminal 200 by base station 100 beforehand. However, in this case, ACK/NACK control section 212 configures NACK (or DTX) as a response signal corresponding to a downlink component carrier in which downlink allocation control information has not been received among the downlink component carriers configured for terminal 200 from base station 100. ACK/NACK control section 212 outputs a bundled ACK/NACK signal formed of response signals corresponding to all downlink component carriers configured in terminal 200 to coding section 213.

Coding section 213 encodes the response signal received from ACK/NACK control section 212 and outputs the encoded response signal to modulation section 214.

Modulation section 214 modulates the response signal received from coding section 213 and outputs the modulated response signal to response signal/data multiplexing section 216 as a waveform on the time axis (time-domain signal).

Coding/modulation section 215 performs coding processing and modulation processing on transmission data (that is, uplink data) using the coding rate and modulation scheme instructed from control section 208 and outputs the modulated signal to response signal/data multiplexing section 216 as a waveform on the time axis.

Response signal/data multiplexing section 216 determines whether or not to multiplex (TDM) the uplink data received from coding/modulation section 215 and the response signal received from modulation section 214 in the time domain according to an instruction from control section 208. To be more specific, when instructed from control section 208 to multiplex the uplink data and the response signal in the time domain, response signal/data multiplexing section 216 multiplexes the uplink data received from coding/modulation section 215 with the response signal received from modulation section 214 in the time domain and outputs the multiplexed signal to DFT section 217. On the other hand, when instructed from control section 208 not to multiplex the uplink data and the response signal in the time domain, response signal/data multiplexing section 216 outputs only the uplink data received from coding/modulation section 215 to DFT section 217 (that is, the uplink data and the response signal are not multiplexed in the time domain).

DFT section 217 transforms the time-domain signal received from response signal/data multiplexing section 216 (that is, time-domain PUSCH signal) into a frequency-domain signal (that is, frequency-domain PUSCH signal) through DFT processing and outputs the frequency-domain PUSCH signal to IFFT section 218.

IFFT section 218 maps the PUSCH signal received from DFT section 217 to a frequency domain based on resource information (PUSCH resources) instructed from control section 208 and applies IFFT processing thereto.

CP adding section 219 adds the same signal as the tail end portion of the IFFT-processed time domain signal to the beginning of the signal as a CP.

Radio transmitting section 220 performs transmission processing such as D/A conversion, amplification and up-conversion on the signal received from CP adding section 219 and transmits the signal after the transmission processing to base station 100 from the antenna. Thus, uplink data is transmitted through an uplink data channel indicated by the uplink allocation control information.

[Operations of Base Station 100 and Terminal 200]

Operations of base station 100 and terminal 200 configured as described above will be described. Hereinafter, a description will be given of the method of mapping response signals when uplink data and response signals corresponding to downlink data are transmitted in the same subframe in terminal 200.

Base station 100 previously configures terminal 200 to perform communication using carrier aggregation. That is, base station 100 configures a plurality of downlink component carriers for terminal 200. Furthermore, a plurality of downlink component carriers configured in terminal 200 are formed of a primary component carrier (PCC) and component carriers other than the primary component carrier (SCC: Secondary Component Carrier).

Furthermore, terminal 200 that has received downlink allocation control information and downlink data from base station 100 configures ACK or NACK as a response signal for each downlink data portion depending on success/failure in decoding the downlink data (reception success/failure situation).

The following description assumes that the number of information portions of a response signal (the number of response signal information portions) for downlink data received in one downlink component carrier by terminal 200 is one or two. When, for example, two downlink data portions are transmitted by Space Division Multiplexing (SDM), terminal 200 generates two response signal information portions per downlink component carrier. However, whether or not SDM is applied for transmission of downlink data is configured independently for each downlink component carrier.

Furthermore, terminal 200 determines a mapping position of response signal information (ACK or NACK) according to the situation where downlink allocation control information is received. However, a case will be described below where one response signal information portion indicates ACK or NACK (that is, two states will be described), but the present invention is also applicable to a case where one response signal information portion indicates one of ACK, NACK and DTX (that is, three states).

Hereinafter, response signal mapping methods 1 and 2 in terminal 200 will be described.

<Mapping Method 1>

Hereinafter, a description will be given of the response signal mapping method in different situations where terminal 200 receives downlink allocation control information in each downlink component carrier (PCC and SCC), i.e., situations 1, 2 and 3.

<Situation 1: When Terminal 200 Receives Downlink Allocation Control Information Using Only PCCs (See FIG. 8A)>

Figure 8A:
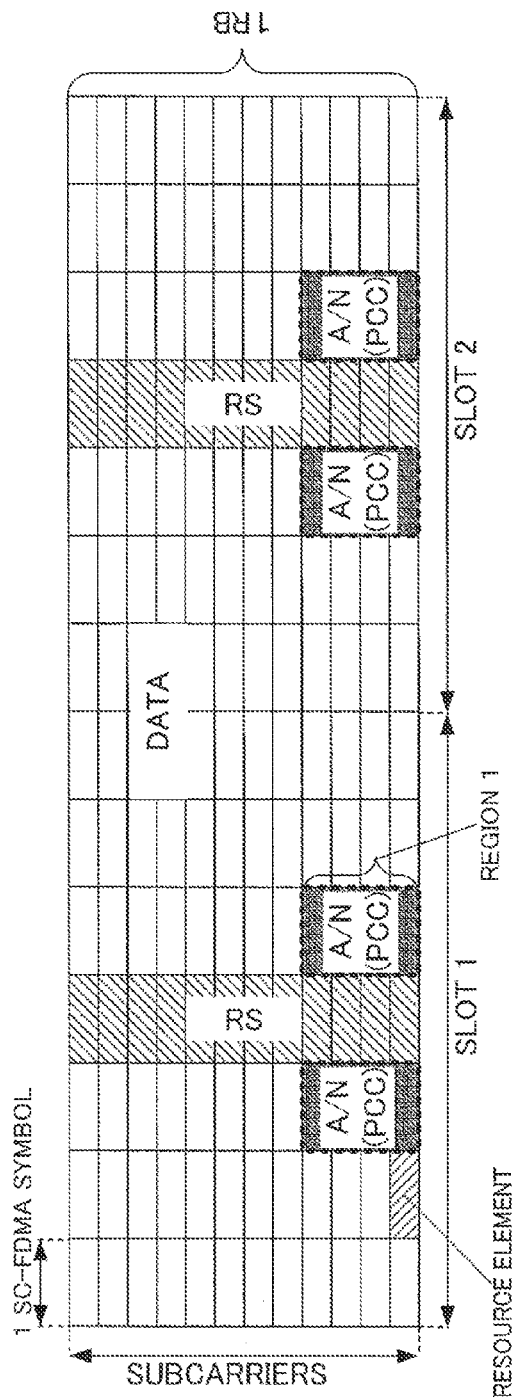
FIGS. 8A & 8B are diagrams illustrating simultaneous transmission processing on response signals and uplink data according to the embodiment of the present invention (mapping method 1)

When terminal 200 receives downlink allocation control information using only PCCs, as shown in FIG. 8A, terminal 200 transmits only a response signal for downlink data transmitted through a PDCCH indicated by downlink allocation control information received in one downlink component carrier (PCC) (i.e., response signal corresponding to PCC "A/N(PCC)") using a method similar to that (e.g., FIG. 2) of a terminal that performs communication without carrier aggregation (e.g., LTE terminal).

To be more specific, in terminal 200, ACK/NACK control section 212 generates response signal information portion (one or two information portions) corresponding to a PCC based on success/failure in decoding (success/failure in receiving) downlink data received through a PDCCH indicated by the downlink allocation control information received using the PCC.

Here, when the number of response signal information portions is one (e.g., 1 bit), modulation section 214 first modulates the response signal information and generates a response signal symbol. Modulation section 214 then repeatedly arranges (repeats) response signal symbols and thereby generates a "response signal symbol set" formed of the number of symbols specified by base station 100.

Furthermore, when the number of response signal information portions is two (e.g., 2 bits), coding section 213 first encodes the response signal information to generate a 3-bit sequence, and modulation section 214 modulates the 3-bit sequence to generate a response signal symbol subset (e.g., 3 symbols). Modulation section 214 then repeatedly arranges (repeats) the response signal symbol subset and thereby generates a "response signal symbol set" formed of the number of symbols instructed by base station 100.

The number of symbols of the response signal symbol set may be instructed separately by signaling from base station 100 or may be determined, for example, in association with the modulation scheme and coding rate (MCS: Modulation and Coding Scheme) of uplink data transmitted by terminal 200 (that is, the number of symbols of the response signal symbol set may be determined in accordance with the MCS of the uplink data).

However, when the number of symbols of the response signal symbol set is determined in association with the MCS of uplink data in situation 1, the number of symbols of the response signal symbol set is determined in consideration of the number of response signal information portions to be transmitted by terminal 200 (e.g., the number of response signal bits). That is, under the condition that the same MCS is configured for uplink data, the number of symbols of the response signal symbol set in the case where the number of response signal bits is 2 is substantially two times that in the case where the number of response signal bits is 1.

Next, response signal/data multiplexing section 216 of terminal 200 time-multiplexes the generated response signal symbol set corresponding to the PCC with the uplink data according to an instruction from control section 208 in a PUSCH.

Figure 1:
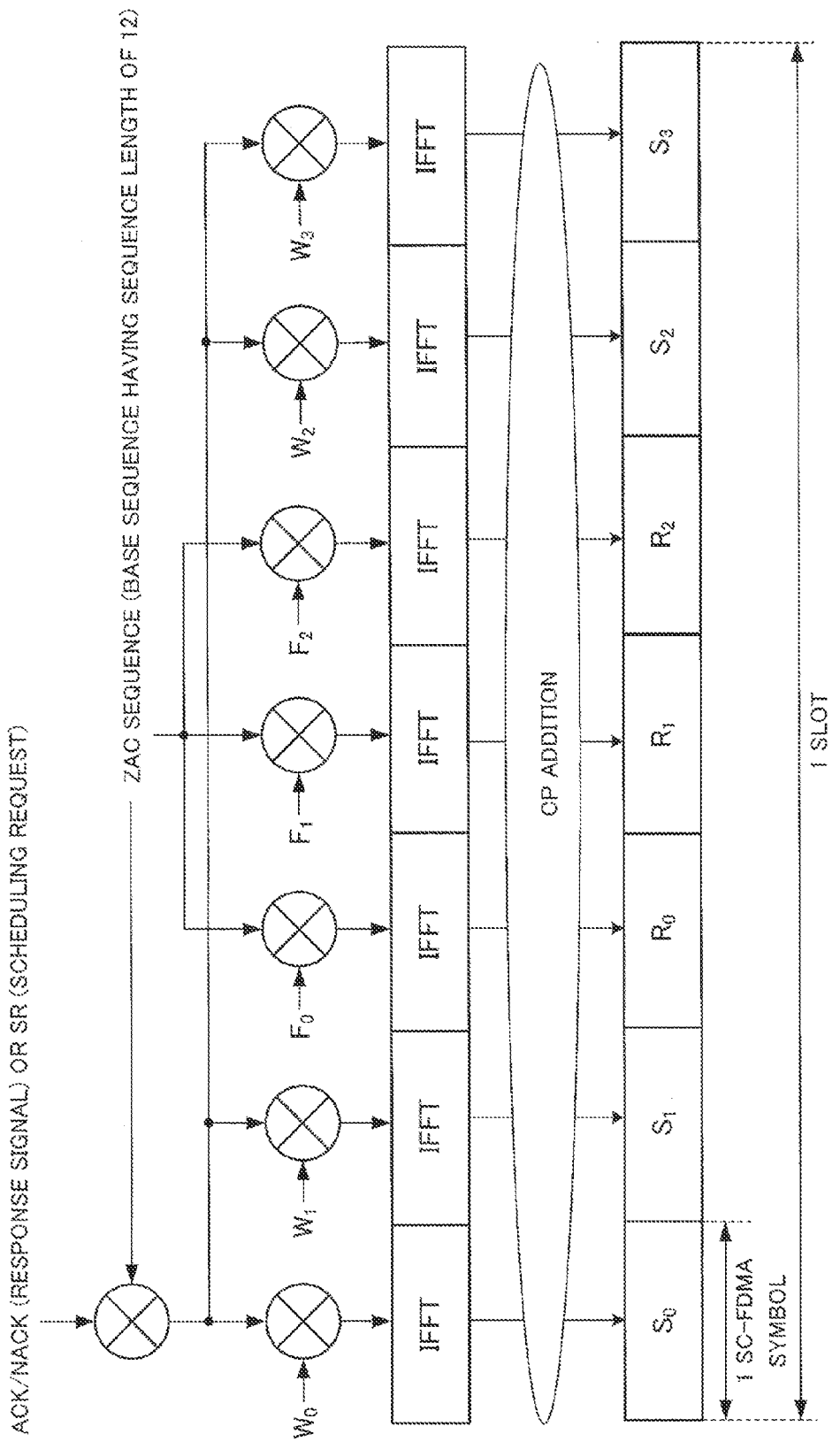
FIG. 1 is a diagram illustrating a method of spreading a response signal and a reference signal.
Figure 2:
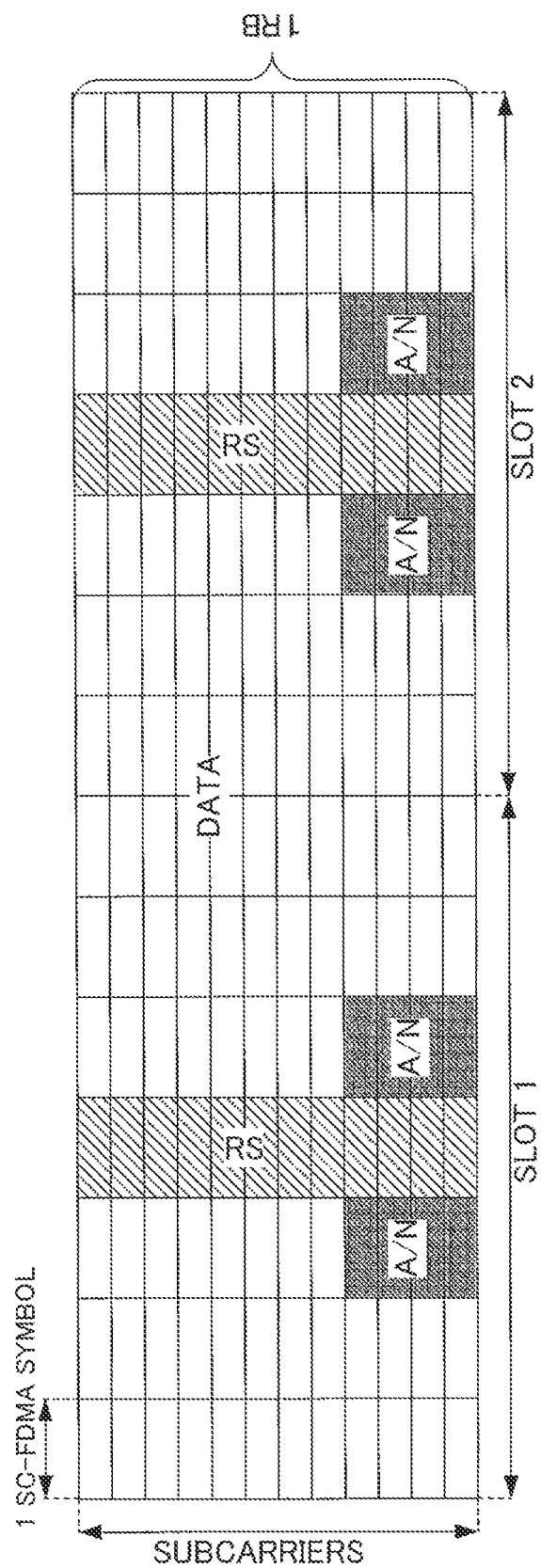
FIG. 2 is a diagram illustrating operation regarding application of TDM to response signals and uplink data in PUSCH resources.
Figure 3B:
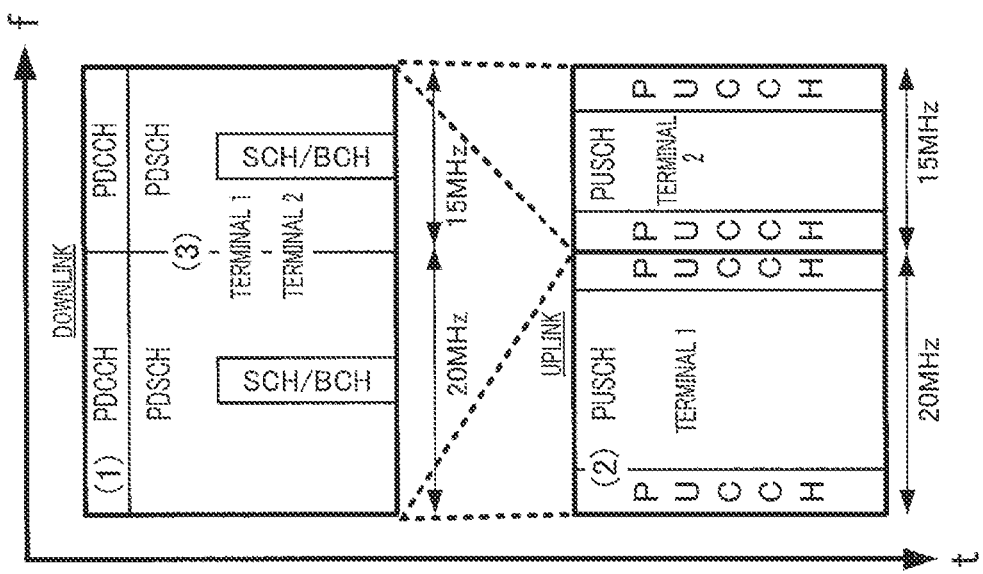
FIGS. 3A & 3B are diagrams illustrating asymmetric carrier aggregation applied to individual terminals and its control sequence.
Figure 3A:
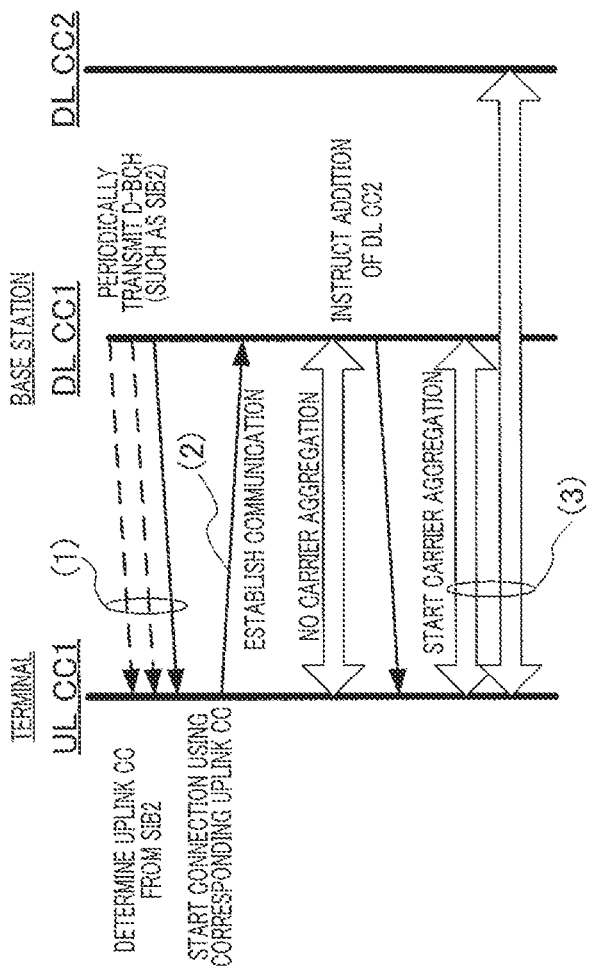

At this time, control section 208 controls the region in the PUSCH to which a response signal is mapped. To be more specific, control section 208 maps the response signal symbol set corresponding to the PCC to the region (uplink resources) in the PUSCH assigned from base station 100. For example, control section 208 maps the response signal symbol set corresponding to the PCC to a region similar to that in the LTE system (FIG. 2). Alternatively, control section 208 maps the response signal symbol set corresponding to the PCC (A/N (PCC) shown in FIG. 8A) to a region in accordance with the number of downlink allocation control information portions assigned to terminal 200 (i.e., only PCCs in situation 1) in the same way as in FIG. 5A (second method).

For example, let us focus on a certain SC-FDMA symbol adjacent to the SC-FDMA symbol to which a reference signal (RS) in the PUSCH shown in FIG. 8A is mapped. As shown in FIG. 8A, control section 208 maps the response signal symbol set corresponding to the PCC (A/N(PCC)) to region 1 which is part of the SC-FDMA symbol (i.e., four resource elements (REs) in FIG. 8A). In FIG. 8A, the response signal symbol set is mapped by puncturing uplink data.

<Situation 2: When Terminal 200 Receives Downlink Allocation Control Information Using Both PCC and SCC (See FIG. 8B)>

Figure 8B:
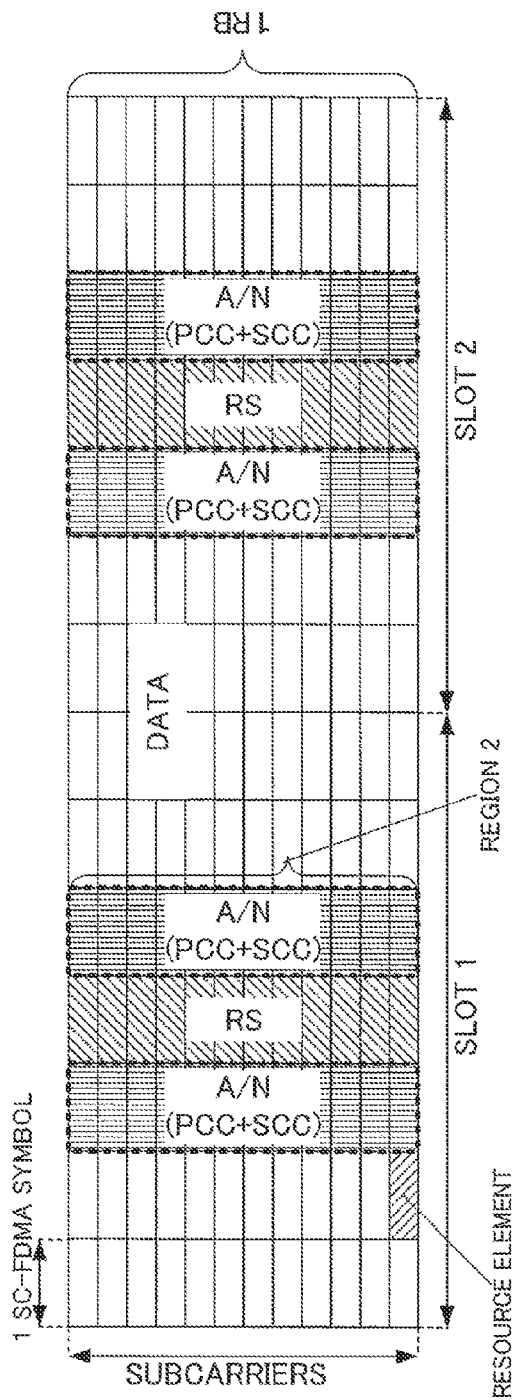

When terminal 200 receives downlink allocation control information using both PCC and SCC, as shown in FIG. 8B, terminal 200 transmits a response signal (response signals corresponding to PCC and SCC, respectively, "ACK/NACK (PCC+SCC)") corresponding to the downlink data transmitted through a PDSCH indicated by the downlink allocation control information received in a plurality of downlink component carriers (PCC and SCC) configured in terminal 200.

To be more specific, in terminal 200, ACK/NACK control section 212 generates response signal information portion (one or two information portions in each downlink component carrier) corresponding to the downlink component carrier based on success/failure in decoding (success/failure in receiving) downlink data received in a downlink component carrier (PCC and SCC that has received downlink allocation control information) in which downlink allocation control information is received among a plurality of downlink component carriers configured in terminal 200.

Furthermore, ACK/NACK control section 212 sets NACK (or DTX) as response signal information corresponding to downlink component carriers (SCCs that have not received downlink allocation control information) other than the downlink component carrier that has received downlink allocation control information among the plurality of downlink component carriers configured in terminal 200.

When terminal 200 receives downlink allocation control information using both PCC and SCC in this way (situation 2), terminal 200 generates response signal information corresponding to all downlink component carriers configured in terminal 200. That is, in situation 2, the number of response signal information portions transmitted from terminal 200 to base station 100 is uniquely determined by the number of downlink component carriers configured in terminal 200 (and whether or not SDM is applied to each downlink component carrier) irrespective of the number of downlink component carriers (downlink component carriers assigned from the base station) through which terminal 200 has received downlink allocation control information.

Coding section 213 then encodes response signal information portions corresponding to all downlink component carriers configured in terminal 200 (ACK/NACK corresponding to PCC and ACK, NACK or DTX corresponding to SCC) collectively (e.g., block coding). Modulation section 214 modulates the encoded response signal information to generate a response signal symbol subset. Modulation section 214 then repeatedly arranges (repeats) the response signal symbol subset to generate a "response signal symbol set" formed of the number of symbols instructed from base station 100.

The number of symbols of the response signal symbol set may be instructed separately by signaling from base station 100 or may be determined in association with the modulation scheme and coding rate (MCS) of uplink data transmitted by, for example, terminal 200.

However, when the number of symbols of the response signal symbol set in situation 2 is determined in association with the MCS of uplink data, the number of symbols of the response signal symbol set is determined in consideration of the total number of response signal information portions (response signal bits) to be transmitted by terminal 200 (that is, the number of bits necessary to transmit all response signal information portions corresponding to the downlink component carriers configured in terminal 200). That is, under the condition that the same MCS is configured in uplink data, the number of symbols of the response signal symbol set when the number of response signal bits is N is determined to be substantially N times that when the number of response signal bits is 1.

Next, response signal/data multiplexing section 216 of terminal 200 time-multiplexes the generated response signal symbol set with the uplink data in a PUSCH according to an instruction from control section 208.

At this time, control section 208 controls the region in the PUSCH to which response signals are mapped. To be more specific, control section 208 maps a response signal symbol set (A/N (PCC+SCC) shown in FIG. 8B) corresponding to all downlink component carriers configured in terminal 200 (PCCs and SCCs) to the region in the PUSCH (uplink resources) assigned from base station 100. For example, control section 208 maps the response signal symbol set corresponding to all downlink component carriers configured in terminal 200 to the "region determined in accordance with the number of downlink component carriers configured in terminal 200" in the PUSCH.

For example, let us focus on a certain SC-FDMA symbol adjacent to the SC-FDMA symbol to which a reference signal (RS) in the PUSCH shown in FIG. 8B is mapped. As shown in FIG. 8B, control section 208 maps a response signal symbol set (A/N (PCC+SCC)) corresponding to all downlink component carriers (PCCs and SCCs) configured in terminal 200 to region 2 (12 REs in FIG. 8B) which is a region determined in accordance with the number of downlink component carriers configured in terminal 200 as in the case of FIG. 4 (first method). That is, region 2 shown in FIG. 8B is a fixed region until the downlink component carriers configured in terminal 200 are changed. The response signal symbol set in FIG. 8B is mapped by puncturing uplink data.

<Situation 3: When Terminal 200 Receives Downlink Allocation Control Information Using Only SCCs (See FIG. 8B)>

When terminal 200 receives downlink allocation control information using only SCCs, in the same way as in situation 2, as shown in FIG. 8B, terminal 200 transmits response signals (response signals corresponding to PCC and SCC, respectively, i.e., "ACK/NACK (PCC+SCC)") for downlink data transmitted through a PDSCH indicated by downlink allocation control information received in a plurality of downlink component carriers (PCC and SCC) configured in terminal 200.

To be more specific, in terminal 200, ACK/NACK control section 212 generates response signal information portion (one or two information portions in each downlink component carrier) corresponding to the downlink component carrier based on success/failure in decoding (success/failure in receiving) downlink data received in the downlink component carrier (SCC) in which downlink allocation control information has been received among the plurality of downlink component carriers configured in terminal 200.

Furthermore, ACK/NACK control section 212 configures NACK (or DTX) as response signal information for PCC. Furthermore, ACK/NACK control section 212 configures NACK (or DTX) as response signal information for SCCs (SCCs through which downlink allocation control information has not been received) other than the SCC through which downlink allocation control information has been received, among the plurality of downlink component carriers configured in terminal 200.

When terminal 200 receives downlink allocation control information using only SCCs in this way (situation 3), as in the case of situation 2, terminal 200 generates response signal information corresponding to all downlink component carriers configured in terminal 200. That is, in situation 3, the number of response signal information portions transmitted from terminal 200 to base station 100 is uniquely determined by the number of downlink component carriers configured in terminal 200 (and depending on whether or not SDM is applied to each downlink component carrier) irrespective of the number of downlink component carriers through which terminal 200 has received downlink allocation control information (downlink component carriers assigned from the base station).

As in the case of situation 2, coding section 213 encodes response signal information portions corresponding to all downlink component carriers configured in terminal 200 (NACK (or DTX) corresponding to PCC and ACK, NACK or DTX corresponding to SCC) collectively (e.g., block coding). Modulation section 214 modulates the encoded response signal information to generate a response signal symbol subset. Modulation section 214 then repeatedly arranges (repeats) the response signal symbol subset to thereby generate a "response signal symbol set" formed of the number of symbols instructed from base station 100.

The number of symbols of the response signal symbol set may be instructed separately by signaling from base station 100 or may be determined in association with the modulation scheme and coding rate (MCS) of uplink data transmitted by, for example, terminal 200.

However, when the number of symbols of the response signal symbol set in situation 3 is determined in association with the MCS of uplink data, the number of symbols of the response signal symbol set is determined in consideration of the total number of response signal information portions (i.e., response signal bits) to be transmitted by terminal 200 (that is, the number of bits necessary to transmit all response signal information portions corresponding to the downlink component carriers configured in terminal 200). That is, under the condition that the same MCS is configured in uplink data, the number of symbols of the response signal symbol set is determined such that the number of symbols of the response signal symbol set when the number of response signal bits is N is determined to be substantially N times that when the number of response signal bits is 1.

Next, response signal/data multiplexing section 216 of terminal 200 time-multiplexes the generated response signal symbol set with the uplink data in a PUSCH according to an instruction from control section 208.

At this time, control section 208 controls the region in the PUSCH to which response signals are mapped. To be more specific, control section 208 maps a response signal symbol set corresponding to all downlink component carriers (PCCs and SCCs) configured in terminal 200 to the region in the PUSCH (uplink resources) assigned from base station 100. For example, control section 208 maps the response signal symbol set corresponding to all downlink component carriers configured in terminal 200 to the "region determined in accordance with the number of downlink component carriers configured in terminal 200" in the PUSCH.

For example, let us focus on a certain SC-FDMA symbol adjacent to the SC-FDMA symbol to which a reference signal (RS) in the PUSCH shown in FIG. 8B is mapped. As shown in FIG. 8B, control section 208 maps a response signal symbol set (A/N (PCC+SCC)) corresponding to all downlink component carriers (PCCs and SCCs) configured in terminal 200 to region 2 (12 REs) which is a region determined in accordance with the number of downlink component carriers configured in terminal 200 in the same way as in FIG. 4 (first method). In FIG. 8B, the response signal symbol set is mapped by puncturing uplink data.

The mapping method in different situations where terminal 200 receives downlink allocation control information: situations 1, 2 and 3 have been described so far.

Thus, in mapping method 1, if terminal 200 receives at least one downlink allocation control information portion in downlink component carriers (SCCs) other than PCCs among the plurality of component carriers configured in terminal 200 (situation 2 or 3) in transmission of uplink data and response signals in the same subframe (i.e., transmission unit time), terminal 200 maps a plurality of response signals (response signal symbol set) respectively corresponding to the plurality of downlink component carriers (PCCs and SCCs) configured in terminal 200 to a region in the PUSCH (region 2 shown in FIG. 8B) determined in accordance with the number of downlink component carriers configured in terminal 200.

In contrast, when transmitting uplink data and response signals in the same subframe (transmission unit time), if terminal 200 receives downlink allocation control information using only PCCs among the plurality of component carriers configured in terminal 200 (situation 1), terminal 200 maps response signals corresponding to PCCs (response signal symbol set) to a region (region 1 in FIG. 8A) which is a region in the PUSCH smaller than the region (region 2 in FIG. 8B) to which response signals are mapped in situations 2 and 3.

As described above, base station 100 configures carrier aggregation for terminal 200 using higher layer signaling (e.g., RRC signaling). However, higher layer signaling cannot be controlled fast, so that base station 100 cannot frequently change the number of downlink component carriers configured in terminal 200. For this reason, even after transmitting a large-volume of data to terminal 200 through carrier aggregation, base station 100 cannot change the configuration of carrier aggregation instantaneously.

Thus, there can be a long period during which communication using a plurality of component carriers is not necessarily required although base station 100 configures carrier aggregation in terminal 200. In other words, even when base station 100 configures carrier aggregation for terminal 200, communication with non-carrier aggregation assignment (i.e., communication using only one downlink component carrier) is performed during most of time (in most subframes).

Furthermore, base station 100 uses PCCs (primary component carriers) when performing communication through non-carrier aggregation assignment. That is, during non-carrier aggregation assignment, a situation where downlink data is transmitted using only downlink component carriers other than PCCs (i.e., SCCs) rarely occurs. This is because in downlink component carriers other than PCCs (i.e., SCCs), there can be a situation where terminal 200 does not monitor downlink data and downlink allocation control information for some periods in order to improve power efficiency on the terminal 200 side.

That is, even when base station 100 configures a plurality of downlink component carriers (carrier aggregation) for terminal 200, communication in situation 1 (communication using only PCCs or communication using non-carrier aggregation assignment) is performed for most of time (most subframes). Therefore, situation 1 (FIG. 8A) occurs more frequently than situation 2 or 3 (FIG. 8B) in communication between base station 100 and terminal 200. That is, even when base station 100 configures a plurality of downlink component carriers (carrier aggregation) for terminal 200, as shown in FIG. 8A, response signals (response signal symbol set) are more frequently mapped to region 1 smaller than region 2 in a PUSCH (e.g., region determined in the same way as in an LTE system). On the other hand, as shown in FIG. 8B, response signals (response signal symbol set) are less frequently mapped to region 2 which is a "region determined in accordance with the number of all downlink component carriers configured in terminal 200" in the PUSCH.

Therefore, mapping method 1 can significantly reduce situations where uplink data are punctured by response signals in PUSCH resources compared to the first method (FIG. 4). In other words, mapping method 1 can limit the situations where uplink data are punctured by response signals in PUSCH resources when terminal 200 receives downlink allocation control information (that is, downlink data) using only PCCs, to the same level as that in an LTE system (FIG. 2).

Furthermore, in mapping method 1, the "difference in recognition of the response signal region between base station 100 and terminal 200" occurs only when terminal 200 fails to receive all downlink allocation control information portions transmitted through SCCs. That is, if terminal 200 can receive at least one downlink allocation control information portion through a plurality of SCCs, no "difference in recognition of the response signal region between base station 100 and terminal 200" occurs.

Thus, whereas the second method (FIG. 5A and FIG. 5B) involves a problem that the "difference in recognition of the response signal region between base station 100 and terminal 200" linearly increases as the number of downlink component carriers increases, mapping method 1 can significantly reduce situations where a "difference in recognition of the response signal region between base station 100 and terminal 200" occurs. That is, in mapping method 1, the "difference in recognition of the response signal region between base station 100 and terminal 200" decreases as the number of downlink component carriers increases. For example, if a BLER (Block error rate) of downlink allocation control information is assumed to be 1% in a case where two downlink component carriers (PCC and SCC) are configured in terminal 200, the "difference in recognition of the response signal region between base station 100 and terminal 200" can be limited to a maximum of approximately 1% (that is, only in the case where terminal 200 cannot receive downlink allocation control information although downlink allocation control information has been transmitted through one SCC).

As described, according to mapping method 1, in an LTE-A system to which carrier aggregation using a plurality of downlink component carriers is applied, even when the terminal simultaneously transmits uplink data and response signals within the same subframe, it is possible to reduce the situations where the uplink data are punctured by the response signals, and reduce the situations where differences occur in recognition of the response signal region in a PUSCH between the base station and the terminal.

<Mapping Method 2>

As mapping method 2, a description will be given of a method that enables the base station to surely receive response signal information corresponding to PCCs even when a "difference in recognition of the response signal region between base station 100 and terminal 200" occurs (that is, when terminal 200 fails to receive all downlink allocation control information portions transmitted through SCCs) in mapping method 1.

Hereinafter, as in the case of mapping method 1, a description will be given of the response signal mapping method in different situations where terminal 200 receives downlink allocation control information in each downlink component carrier (PCC and SCC): situations 1, 2 and 3.

<Situation 1: When Terminal 200 Receives Downlink Allocation Control Information Using Only PCCs (See FIG. 8A)>

When terminal 200 receives downlink allocation control information using only PCCs, terminal 200 performs processing similar to that in mapping method 1.

That is, terminal 200 (ACK/NACK control section 212) generates response signal information portions (one or two information portions) based on success/failure in decoding (success/failure in receiving) downlink data received through a PDSCH indicated by downlink allocation control information received through PCCs as in the case of situation 1 of mapping method 1. Furthermore, terminal 200 (i.e., coding section 213 and modulation section 214) encodes and modulates response signal information in accordance with the number of response signal information portions (number of response signal bits) as in the case of situation 1 of mapping method 1 and generates a "response signal symbol set" formed of the number of symbols instructed from base station 100.

Terminal 200 (i.e., response signal/data multiplexing section 216) time-multiplexes the generated response signal symbol set corresponding to the PCCs with uplink data in a PUSCH. At this time, control section 208 controls the region in the PUSCH to which response signals are mapped. To be more specific, as in situation 1 of mapping method 1, control section 208 of terminal 200 maps a response signal symbol set corresponding to PCCs to the region (e.g., region 1 shown in FIG. 8A) in the PUSCH similar to the LTE system (FIG. 2), for example. Alternatively, control section 208 maps the response signal symbol set corresponding to PCC (A/N(PCC) shown in FIG. 8A) to a region (e.g., region 1 shown in FIG. 8A) in accordance with the number of downlink allocation control information portions (i.e., only PCCs in situation 1) assigned to terminal 200 as in the case of FIG. 5A (second method). In FIG. 8A, the response signal symbol set is mapped by puncturing uplink data.

<Situation 2: When Terminal 200 Receives Downlink Allocation Control Information Through Both PCC and SCC (See FIG. 9A)>

Figure 9A:
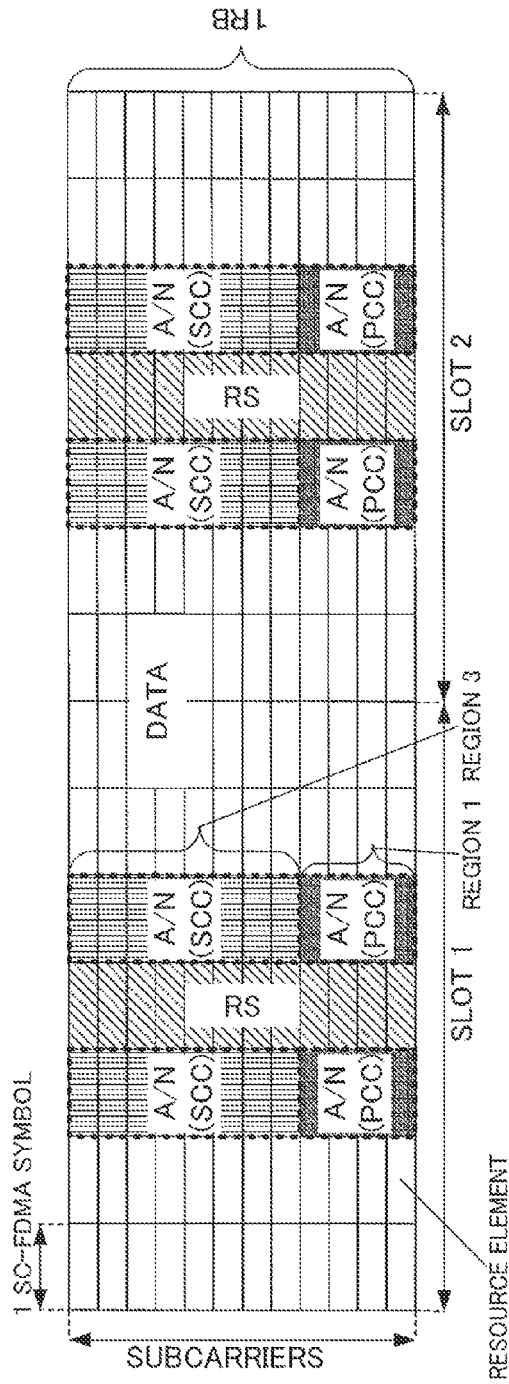
FIGS. 9A & 9B are diagrams illustrating simultaneous transmission processing on response signals and uplink data according to the embodiment of the present invention (mapping method 2)

Upon receipt of downlink allocation control information through both PCC and SCC, as shown in FIG. 9A, terminal 200 transmits response signals corresponding to downlink data transmitted through a PDSCH indicated by downlink allocation control information received in a plurality of downlink component carriers (PCC and SCC) configured in terminal 200 (response signals corresponding to PCC and SCC, respectively, "A/N(PCC)" and "A/N(SCC)").

To be more specific, in terminal 200, ACK/NACK control section 212 generates response signal information corresponding to PCCs among a plurality of downlink component carriers configured in terminal 200 as in the case of situation 1 (FIG. 8A). Modulation section 214 then repeatedly arranges (repeats) response signal information corresponding to PCCs to thereby generate a response signal symbol set ("PCC response signal symbol set").

Furthermore, ACK/NACK control section 212 generates response signal information corresponding to all SCCs among the plurality of downlink component carriers configured in terminal 200. That is, ACK/NACK control section 212 generates response signal information portion (one or two information portions in each downlink component carrier) corresponding to the SCCs based on success/failure in decoding (success/failure in receiving) downlink data received in the SCCs through which downlink allocation control information has been received. Furthermore, ACK/NACK control section 212 configures NACK (or DTX) as response signal information corresponding to SCCs other than the SCC through which downlink allocation control information has been received among the plurality of downlink component carriers configured in terminal 200. Coding section 213 then encodes response signal information portions corresponding to all SCCs (e.g., block coding). Modulation section 214 modulates the encoded response signal information to generate a response signal symbol subset corresponding to the SCCs (i.e., "SCC response signal symbol subset"). Modulation section 214 then repeatedly arranges (repeats) the SCC response signal symbol subset to thereby generate an SCC response signal symbol set" formed of the number of symbols instructed from base station 100.

As described above, upon receipt of downlink allocation control information through both PCC and SCC (situation 2), terminal 200 generates response signal information portions corresponding to all downlink component carriers configured in terminal 200 as in the case of situation 2 (and 3) of mapping method 1. However, terminal 200 individually encodes (separate coding) response signals corresponding to PCCs and response signals corresponding to SCCs in a plurality of downlink component carriers configured in terminal 200. Thus, terminal 200 generates a PCC response signal symbol set and an SCC response signal symbol set.

The number of symbols of the response signal symbol set may be instructed separately by signaling from base station 100 as in the case of mapping method 1 or may be determined in association with the modulation scheme and coding rate (MCS) of uplink data transmitted by terminal 200, for example. Furthermore, the number of symbols of the PCC response signal symbol set and the number of symbols of the SCC response signal symbol set may be determined independently of each other. However, when the number of symbols of the response signal symbol set is determined in association with MCS of uplink data in situation 2, the number of symbols of the response signal symbol set is determined in consideration of the total number of bits of response signal information corresponding to PCCs to be transmitted by terminal 200 and the total number of bits of response signal information corresponding to the set of SCCs.

Next, response signal/data multiplexing section 216 of terminal 200 time-multiplexes the generated response signal symbol set and uplink data in a PUSCH according to an instruction from control section 208.

At this time, control section 208 controls the region in the PUSCH to which response signals are mapped. To be more specific, control section 208 maps the response signal symbol set corresponding to all downlink component carriers (PCCs and SCCs) configured in terminal 200 (i.e., A/N(PCC) and A/N(SCC) shown in FIG. 9A) to a region in the PUSCH (i.e., uplink resources) assigned from base station 100. For example, control section 208 maps the PCC response signal symbol set corresponding to PCCs to the "region in accordance with only PCCs (i.e., region 1 shown in FIG. 9A)" in the PUSCH and maps the SCC response signal symbol set corresponding to all SCCs configured in terminal 200 to a "region determined in accordance with the number of SCCs configured in terminal 200 (region 3 shown in FIG. 9A)" in the PUSCH.

For example, let us focus on a certain SC-FDMA symbol adjacent to the SC-FDMA symbol to which a reference signal (RS) in the PUSCH shown in FIG. 9A is mapped. As shown in FIG. 9A, control section 208 maps a PCC response signal symbol set (A/N (PCC)) to region 1 shown in FIG. 9A and also maps an SCC response signal symbol set (A/N(SCC)) to region 3 (8 REs in FIG. 9A) which is a region determined according to the number of SCCs configured in terminal 200. That is, region 3 shown in FIG. 9A is a fixed region until the number of SCCs configured in terminal 200 (that is, the number of downlink component carriers other than PCCs) is changed.

Here, as shown in FIG. 9A, region 3 (the fixed region determined in accordance with the number of SCCs configured in terminal 200) is arranged on REs different from REs in the region (region 1) to which the response signal symbol set (A/N(PCC)) corresponding to PCCs in situation 1 (FIG. 8A) is mapped. As shown in FIG. 9A, control section 208 maps the PCC response signal symbol set (A/N(PCC)) to region 1 (4 REs) and maps the SCC response signal symbol set (A/N(SCC)) to region 3 (8 REs) other than region 1. In FIG. 9A, the response signal symbol set is mapped by puncturing uplink data.

That is, in situation 1 (FIG. 8A) and situation 2 (FIG. 9A), the region in the PUSCH to which response signal information for PCC is mapped is not changed. On the other hand, in situation 2, the SCC response signal symbol set is mapped to the region (region 3) which is different from region 1 and which is determined in accordance with the number of SCCs configured in terminal 200. In FIG. 9A, the SCC response signal symbol set is mapped to a region adjacent to region 1 to which the PCC response signal symbol set is mapped. In other words, in FIG. 9A, the SCC response signal symbol set is mapped to REs contiguous to the REs occupied by the response signal in the LTE system (FIG. 2).

<Situation 3: When Terminal 200 Receives Downlink Allocation Control Information Through Only SCCs (See FIG. 9B)>

Figure 9B:
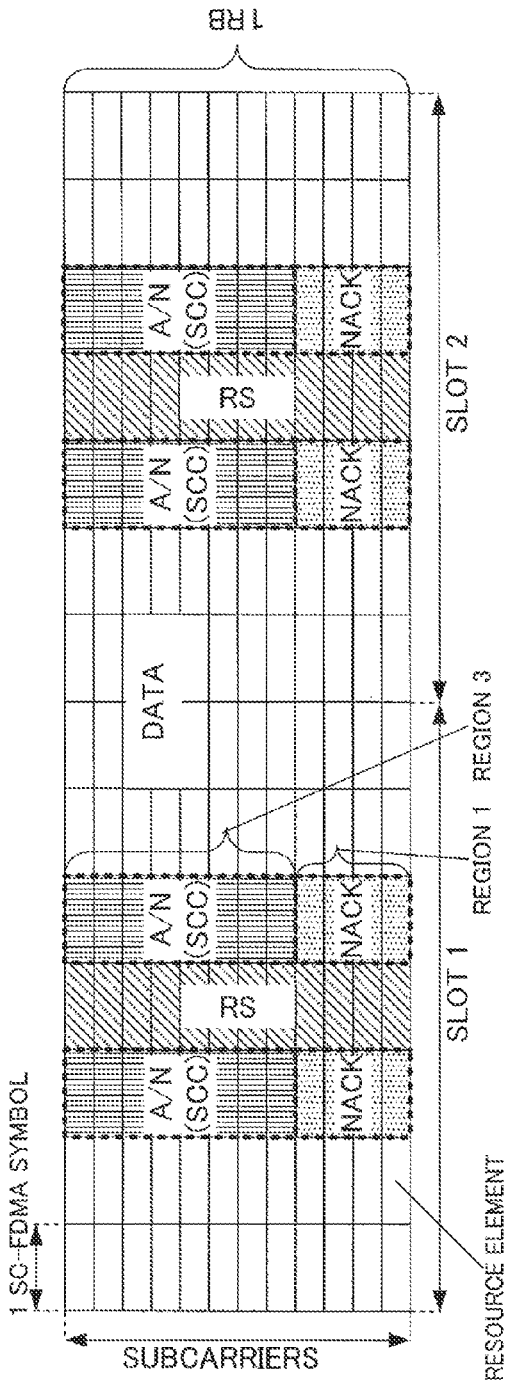

When terminal 200 receives downlink allocation control information through only SCCs, as shown in FIG. 9B, terminal 200 transmits response signals for downlink data transmitted through a PDSCH indicated by downlink allocation control information received in a plurality of downlink component carriers (PCCs and SCCs) configured in terminal 200 (response signals corresponding to PCC and SCC, respectively, "A/N(PCC)" and "A/N(SCC)") as in the case of situation 2.

To be more specific, in terminal 200, ACK/NACK control section 212 configures NACK (or DTX) as response signal information corresponding to PCC among a plurality of downlink component carriers configured in terminal 200. Modulation section 214 then repeatedly arranges (repeats) response signal information corresponding to PCCs to thereby generate a "PCC response signal symbol set."

Furthermore, ACK/NACK control section 212 generates response signal information corresponding to all SCCs among a plurality of downlink component carriers configured in terminal 200. That is, as in the case of situation 2, ACK/NACK control section 212 generates response signal information portion (one or two information portions in each downlink component carrier) corresponding to SCCs through which downlink allocation control information has been received based on success/failure in decoding (success/failure in receiving) downlink data received through the SCCs. Furthermore, ACK/NACK control section 212 configures NACK (or DTX) as response signal information corresponding to SCCs other than the SCC through which downlink allocation control information has been received among a plurality of downlink component carriers configured in terminal 200. Coding section 213 encodes response signal information corresponding to all SCCs, collectively, (e.g., block coding). Modulation section 214 modulates the encoded response signal information to thereby generate an "SCC response signal symbol subset."

Modulation section 214 then repeatedly arranges (repeats) the SCC response signal symbol subset to thereby generate an "SCC response signal symbol set" formed of the number of symbols specified from base station 100.

Thus, when terminal 200 receives downlink allocation control information through both PCC and SCC, terminal 200 encodes (separate coding) response signals corresponding to PCCs and response signals corresponding to SCCs separately in a plurality of downlink component carriers configured in terminal 200 as in the case of situation 2. Thus, a PCC response signal symbol set and an SCC response signal symbol set are generated separately in terminal 200.

The number of symbols of the response signal symbol set may be instructed separately by signaling from base station 100 or may be determined in association with the modulation scheme and coding rate (MCS) of uplink data transmitted by terminal 200, for example. Moreover, the number of symbols of the PCC response signal symbol set and the number of symbols of the SCC response signal symbol set may be determined independently of each other. However, in situation 3, when the number of symbols of the response signal symbol set is determined in association with the MCS of uplink data, the number of symbols of the response signal symbol set is determined in consideration of the total number of bits of response signal information corresponding to the PCCs to be transmitted by terminal 200 and the total number of bits of response signal information corresponding to the set of SCCs.

Next, response signal/data multiplexing section 216 of terminal 200 time-multiplexes the generated response signal symbol set with the uplink data in a PUSCH according to an instruction from control section 208.

At this time, control section 208 controls the region in the PUSCH to which response signals are mapped. To be more specific, control section 208 maps a response signal symbol set (NACK (A/N(PCC)) and A/N (SCC) shown in FIG. 9B) corresponding to all downlink component carriers (PCCs and SCCs) configured in terminal 200 to the region (uplink resources) assigned from base station 100 in the PUSCH. For example, control section 208 maps the response signal symbol set corresponding to PCCs to a "region corresponding to only PCCs (region 1 shown in FIG. 9B)" in the PUSCH as in the case of situation 2 and also maps the SCC response signal symbol set corresponding to all SCCs configured in terminal 200 to a "region determined in accordance with the number of SCCs configured in terminal 200 (region 3 shown in FIG. 9B)" in the PUSCH.

For example, let us focus on a certain SC-FDMA symbol adjacent to the SC-FDMA symbol to which a reference signal (RS) in the PUSCH shown in FIG. 9B is mapped. As shown in FIG. 9B, as in the case of situation 2, control section 208 maps a PCC response signal symbol set (A/N (PCC)) to region 1 shown in FIG. 9B and also maps the SCC response signal symbol set (A/N (SCC)) to region 3 which is a region determined in accordance with the number of SCCs configured in terminal 200 (i.e., 8 REs in FIG. 9B).

That is, region 3 shown in FIG. 9B is a fixed region until the number of SCCs configured in terminal 200 (that is, the number of downlink component carriers) is changed.

However, as in the case of situation 2 (FIG. 9A), control section 208 maps the PCC response signal symbol set (A/N (PCC), NACK here) to region 1 (4 REs) and maps the SCC response signal symbol set (A/N(SCC)) to region 3 (8 REs) as shown in FIG. 9B.

In FIG. 9B, the response signal symbol set is mapped by puncturing uplink data.

That is, as in the case of situation 2 (FIG. 9A), in situation 1 (FIG. 8A) and situation 3 (FIG. 9B), the region in the PUSCH to which PCC response signal information (NACK) is mapped is not changed. Furthermore, as in the case of situation 2 (FIG. 9A), in situation 3 (FIG. 9B), the SCC response signal symbol set is mapped to the region determined in accordance with the number of SCCs configured in terminal 200 (i.e., region 3). That is, in FIG. 9B as well as FIG. 9A, the SCC response signal symbol set is mapped to a region different from region 1 (REs occupied by response signals in the LTE system (FIG. 2)) to which the PCC response signal symbol set is mapped (e.g., REs contiguous to region 1 (4 REs)).

The mapping method in different situations where terminal 200 receives downlink allocation control information (i.e., situations 1, 2 and 3) have been described so far.

Thus, in mapping method 2, if terminal 200 receives downlink allocation control information through only PCCs among the plurality of component carriers configured in terminal 200 (i.e., situation 1) in transmission of uplink data and response signals in the same subframe (i.e., transmission unit time), terminal 200 maps the response signals (response signal symbol set) corresponding to the PCCs to a region (region 1 shown in FIG. 8A) which is in the PUSCH and which is smaller than the region to which response signals are mapped in situation 2 and situation 3 (i.e., the sum of region 1 and region 3 shown in FIG. 9A and FIG. 9B) as in the case of mapping method 1.

Furthermore, if terminal 200 receives at least one downlink allocation control information portion in downlink component carriers (SCCs) other than PCCs among a plurality of component carriers configured in terminal 200 (situations 2 and 3) in transmission of the uplink data and response signals within the same subframe (i.e., transmission unit time), terminal 200 maps a PCC response signal symbol set corresponding to PCCs to a "region corresponding to only PCCs (e.g., region 1 shown in FIG. 9B)" in the PUSCH and maps an SCC response signal symbol set corresponding to all SCCs configured in terminal 200 to a "region determined in accordance with the number of SCCs configured in terminal 200 (e.g., region 3 shown in FIG. 9B)" in the PUSCH.

However, at this time, as shown in FIG. 9A and FIG. 9B, region 1 and region 3 are different regions, and terminal 200 maps response signals corresponding to PCCs (i.e., PCC response signal symbol set) to region 1 and maps response signals corresponding to SCCs (i.e., SCC response signal symbol set) to region 3 other than region 1.

That is, terminal 200 always transmits response signals corresponding to PCCs (i.e., PCC response signal symbol set) to region 1 (the same region as in the LTE system (FIG. 2)) shown in FIG. 8A, FIG. 9A and FIG. 9B. On the other hand, terminal 200 uses an additional region (i.e., additional resource) other than region 1 shown in FIG. 9A and FIG. 9B, that is, region 3 only when receiving downlink allocation control information through SCCs.

Thus, compared to mapping method 1 (FIG. 8A, FIG. 8B), mapping method 2 (FIG. 8A, FIG. 9A and FIG. 9B) can reduce uplink data overhead caused by uplink data being punctured by response signals in a PUSCH (i.e., degradation of transmission quality of uplink data) on substantially equal terms.

However, as described above, there remains a problem in mapping method 1 that, when terminal 200 fails to receive all downlink allocation control information portions transmitted through SCCs, a "difference in recognition of the response signal region between base station 100 and terminal 200" occurs. That is, when terminal 200 fails to receive all downlink allocation control information portions transmitted through SCCs, terminal 200 is more likely to fail to receive not only response signal information corresponding to SCCs but also response signal information corresponding to PCCs.

For example, when an error occurs in base station 100 in receiving a NACK response signal i.e., erroneous reception as if the response is ACK (NACK to ACK error) or in receiving a DTX response signal, i.e., erroneous reception as if the response is ACK (DTX to ACK error), the physical layer misrecognizes that data has been normally transmitted to terminal 200 and stops data retransmission. In this case, a phenomenon occurs in base station 100 in which until data transmission is tried again according to a timer in a higher layer, the data never arrives at terminal 200. That is, degradation of error rate characteristics of response signals (receiving quality of response signals) may cause a drastic increase of delay in data transmission.

Furthermore, since the higher layer signaling is mainly performed through PCCs, any increase of delay in transmission of data transmitted through PCCs (data containing control information of the higher layer) is not acceptable. Furthermore, as described above, base station 100 uses PCCs (primary component carriers) when performing communication through non-carrier aggregation assignment. Thus, the error rate characteristics (receiving quality) of response signals for data transmitted through PCCs need to guarantee a certain level of quality.

In contrast, according to mapping method 2, terminal 200 encodes response signal information for PCCs and response signal information for SCCs separately and maps the response signal information to different regions in a PUSCH. Furthermore, terminal 200 always maps response signal information corresponding to PCCs (PCC response signal symbol set) to the same region (i.e., region 1 shown in FIG. 8A) independently of the reception situation of downlink allocation control information in each downlink component carrier (PCC and SCC) (that is, in any one of situations 1 to 3).

Therefore, according to mapping method 2, even when terminal 200 fails to receive all downlink allocation control information portions transmitted through SCCs, there is no difference in recognition of the response signal region corresponding to PCCs between base station 100 and terminal 200 because the region to which the response signal information corresponding to PCCs is mapped is invariable. That is, the system throughput is improved compared to mapping method 1 since degradation in receiving quality of response signals corresponding to PCCs used to transmit important data (data requiring quick response) can be prevented.

Thus, according to mapping method 2, in an LTE-A system to which carrier aggregation using a plurality of downlink component carriers is applied, even when the terminal simultaneously transmits uplink data and response signals within the same subframe, it is possible to reduce situations where uplink data is punctured by response signals and also eliminate differences in recognition regarding the response signal region corresponding to PCCs in particular in a PUSCH between the base station and the terminal.

A case has been described in mapping method 2 where an SCC response signal symbol set is mapped to a position (RE) contiguous to a PCC response signal symbol set, but mapping of the SCC response signal is not limited to this. That is, if the position (RE) to which a PCC response signal symbol set is mapped is invariable, for example, the SCC response signal symbol set may also be mapped to a position contiguous to the position to which other control signals (CQI, RI, PMI) are mapped and may be encoded together with other control signals (e.g., CQI) and mapped to any position.

Furthermore, a case has been described in mapping method 2 where a PCC response signal symbol set corresponding to PCCs is mapped to a "region corresponding to only PCCs (i.e., region 1 shown in FIG. 9B)" in a PUSCH while an SCC response signal symbol set corresponding to all SCCs configured in terminal 200 is mapped to a "region determined in accordance with the number of SCCs configured in terminal 200 (i.e., region 3 shown in FIG. 9B)" in a PUSCH. However, terminal 200 may use part of the "region (i.e., region 2 in FIG. 8B) determined in accordance with the number of all downlink component carriers configured by the base station in terminal 200" as region 1 and use another part of region 2 other than region 1 as region 3. In this case, effects obtained are the same as those described above.

Furthermore, a case has been described in mapping method 2 where in the case of situation 3 (that is, downlink allocation control information is received only through SCCs), NACK (or DTX) is configured in a PCC response signal symbol set and mapped to region 1 shown in FIG. 9B. However, in the case of situation 3, the present invention may be configured to perform control so that the PCC response signal symbol set itself is not generated and data is not punctured in region 1 (data is arranged in region 1). Focusing on region 1, this operation is equivalent to operation when the terminal fails to receive downlink allocation control information during communication without carrier aggregation. In this case, in order for the base station to judge "detection failure of downlink allocation control information corresponding to PCCs" on the terminal side, the base station side may perform operation of detecting "whether or not a PCC response signal symbol set from the terminal is arranged in region 1."

This can reduce the amount of data to be punctured, thus improving transmission quality of uplink data.

Furthermore, a case has been described in mapping method 2 where the size of region 3 is set in accordance with the number of SCCs configured in the terminal, and an SCC response signal symbol set corresponding to all the SCCs configured in terminal 200 is arranged in region 3, but the size of region 3 can be set in different ways. For example, the size of region 3 may be set in accordance with the number of downlink allocation control information portions corresponding to SCCs received by terminal 200 and an SCC response signal symbol set corresponding to the number of downlink allocation control information portions received by terminal 200 may be arranged in region 3. In this case, "differences in recognition of the response signal region between base station 100 and terminal 200" may occur with frequency substantially equal to that of the second method (FIG. 5A and FIG. 5B). However, since the region to which response signal information corresponding to PCCs is mapped is invariable, there is no difference in recognition of the response signal region corresponding to PCCs between base station 100 and terminal 200. That is, the effect of preventing degradation of receiving quality of response signals corresponding to PCCs used to transmit more important data (data requiring quick response) can be expected.

Response signal mapping methods 1 and 2 in terminal 200 have been described so far.

As described above, according to the present embodiment, in a communication system to which carrier aggregation using a plurality of downlink component carriers is applied, even when the terminal simultaneously transmits uplink data and response signals within the same subframe, it is possible to reduce situations where uplink data is punctured by a plurality of response signals. Furthermore, according to the present embodiment, it is possible to reduce the possibility of generating differences in recognition regarding a response signal region in a PUSCH assigned to uplink data between the base station and the terminal.

The embodiment of the present invention has been described so far.

In the above embodiment, control section 101 of base station 100 is configured to perform control so that downlink data and downlink allocation control information corresponding to the downlink data are mapped to the same downlink component carrier, but the present invention is not limited to this configuration. That is, even when downlink data and downlink allocation control information corresponding to the downlink data are mapped to different downlink component carriers, the techniques described in the embodiment are applicable if the correspondence between the downlink allocation control information and the downlink data is clear. In this case, it is possible for terminal 200 to perform the operation in situation 1 (FIG. 8A) when receiving only downlink allocation control information corresponding to downlink data arranged in PCCs among a plurality of component carriers configured in terminal 200. In addition, it is possible for terminal 200 to perform the operation in situation 2 or 3 (FIG. 8B, FIG. 9A or FIG. 9B) when receiving even one downlink allocation control information portion corresponding to downlink data arranged in SCCs among a plurality of component carriers configured in terminal 200.

Furthermore, although an antenna has been described in the aforementioned embodiment, the present invention may be similarly applied to an antenna port.

The antenna port refers to a logical antenna including a single or a plurality of physical antenna(s).

That is, the antenna port is not limited to a single physical antenna, but may refer to an antenna array including a plurality of antennas.

For example, in 3 GPP LTE, how many physical antennas are included in the antenna port is not specified, but an antenna port is specified as a minimum unit allowing the base station to transmit a different reference signal.

In addition, the antenna port may be specified as a minimum unit in multiplication of a weight of the precoding vector.

Also, although the present invention has been described with an example employing a hardware configuration in the above embodiment, but the present invention can also be realized by software in cooperation with hardware.

Each function block employed in the description of the aforementioned embodiment may typically be implemented as an LSI, which is an integrated circuit. These functional blocks may be formed as individual chips or partially or totally contained in a single chip. The term "LSI" is used herein but this may also be referred to as "IC," "system LSI," "super LSI," or "ultra LSI" depending on the degree of integration.

Further, the method of circuit integration is not limited to LSI's, and implementation using dedicated circuitry or general purpose processors is also possible.

It is also possible to use, after LSI manufacture, a programmable FPGA (Field Programmable Gate Array) or a reconfigurable processor where connections and settings of circuit cells within an LSI can be reconfigured.

Furthermore, if integrated circuit technology emerges and replaces the LSI technology as a result of the advancement of semiconductor technology or a derivative of another technology, this technology can be used for integration of the functional blocks as a matter of course. Application of biotechnology is also possible.

The disclosure of Japanese Patent Application No. 2010-106461, filed on May 6, 2010, including the specification, drawings and abstract is incorporated herein by reference in its entirety.

Industrial Applicability

The present invention is applicable to a mobile communication system or the like.

REFERENCE SIGNS LIST 100 base station
200 terminal
101, 208 control section
102 control information generating section
103, 213 coding section
104, 214 modulation section
105 coding section
106 data transmission control section
107 modulation section
108 mapping section
109, 218 IFFT section
110, 219 CP adding section
111, 220 radio transmitting section
112, 201 radio receiving section
113, 202 CP removing section
114 PUSCH demultiplexing section
115 IDFT section
116 response signal demultiplexing section
117 response signal receiving section
118 demodulation/decoding section
119 decision section
120 retransmission control signal generating section
203 FFT section
204 extraction section
205, 209 demodulation section
206, 210 decoding section
207 decision section
211 CRC section
212 ACK/NACK control section
215 coding/modulation section
216 response signal/data multiplexing section
217 DFT section

The invention claimed is:

1. A terminal apparatus that communicates with a base station, using some or all of a plurality of configured downlink component carriers, the apparatus comprising:
a receiving section that receives downlink allocation control information portions transmitted through downlink control channels of the plurality of downlink component carriers and downlink data transmitted through a downlink data channel indicated by the downlink allocation control information portions;
a generating section that generates a response signal based on success or failure in receiving the downlink data, the response signal including a first response signal corresponding to a first downlink component carrier among the plurality of component carriers and a second response signal corresponding to a second downlink component carrier among the plurality of component carriers;
a coding section that separately encodes the first response signal and the second response signal; and
a mapping section that maps the first response signal and the second response signal to different regions in an uplink data channel region, respectively, while the first response signal and the second response signal are time-multiplexed with an uplink data, wherein
the mapping section maps the first response signal to the same region independently of a reception situation of the downlink allocation control information portions in the plurality of downlink component carriers.

2. The terminal apparatus according to claim 1, wherein, upon receipt of at least one of the downlink allocation control information portions that corresponds to the second downlink component carrier, the mapping section maps the second response signal to a region determined in accordance with a number of the second downlink component carriers configured in the terminal apparatus.

3. The terminal apparatus according to claim 1, wherein, upon receipt of at least one of the downlink allocation control information portions that corresponds to the second downlink component carrier, the mapping section maps the second response signal to a region determined in accordance with a number of all downlink component carriers configured in the terminal apparatus.

4. The terminal apparatus according to claim 1, wherein, upon receipt of at least one of the downlink allocation control information portions that corresponds to the second downlink component carrier, the mapping section maps the second response signal to a region contiguous to a region to which another control signal is mapped.

5. The terminal apparatus according to claim 1, wherein the generating section determines a number of symbols of the first response signal and a number of symbols of the second response signal, independently.

6. A terminal apparatus that communicates with a base station, using some or all of a plurality of configured downlink component carriers, the apparatus comprising:
a receiving section that receives downlink allocation control information portions transmitted through downlink control channels of the plurality of downlink component carriers and downlink data transmitted through a downlink data channel indicated by the downlink allocation control information portions;
a generating section that generates a response signal based on success or failure in receiving the downlink data, the response signal including a first response signal corresponding to a first downlink component carrier among the plurality of component carriers and a second response signal corresponding to a second downlink component carrier among the plurality of component carriers;
a coding section that separately encodes the first response signal and the second response signal; and
a mapping section that maps the first response signal and the second response signal to different regions in an uplink data channel region, respectively, while the first response signal and the second response signal are time-multiplexed with an uplink data, wherein
upon receipt of only at least one of the downlink allocation control information portions that corresponds to the second downlink component carrier, the mapping section does not map the first response to an uplink data channel region.

7. A response signal mapping method in a terminal apparatus that communicates with a base station, using some or all of a plurality of configured downlink component carriers, the method comprising:
receiving downlink allocation control information portions transmitted through downlink control channels of the plurality of downlink component carriers;
receiving downlink data transmitted through a downlink data channel indicated by the downlink allocation control information portions;
generating a response signal based on success or failure in receiving the downlink data, the response signal including a first response signal corresponding to a first downlink component carrier among the plurality of component carriers and a second response signal corresponding to a second downlink component carrier among the plurality of component carriers;
encoding the first response signal and the second response signal; and
mapping the first response signal to the same region in an uplink data channel region independently of a reception situation of the downlink allocation control information portions in the plurality of downlink component carriers, while the first response signal is time-multiplexed with an uplink data.

* * * * *